(12) United States Patent
Nucci et al.

(10) Patent No.: US 7,945,668 B1
(45) Date of Patent: May 17, 2011

(54) SYSTEM AND METHOD FOR CONTENT-AWARE CO-CLUSTERING ALGORITHM BASED ON HOURGLASS MODEL

(75) Inventors: Antonio Nucci, San Jose, CA (US); Ram Keralapura, Santa Clara, CA (US)

(73) Assignee: Narus, Inc., Sunnyvale, CA (US)

( * ) Notice: Subject to any disclaimer, the term of this patent is extended or adjusted under 35 U.S.C. 154(b) by 76 days.

(21) Appl. No.: 12/545,750

(22) Filed: Aug. 21, 2009

(51) Int. Cl.
*G06F 15/173* (2006.01)
(52) U.S. Cl. .................. 709/225; 707/999.001
(58) Field of Classification Search .......... 709/223, 709/225; 707/999.001
See application file for complete search history.

(56) References Cited

U.S. PATENT DOCUMENTS

| 7,043,514 | B1 * | 5/2006 | Achlioptas | 708/401 |
| 7,293,007 | B2 * | 11/2007 | Ma et al. | 1/1 |
| 7,428,541 | B2 * | 9/2008 | Houle | 1/1 |
| 2005/0240563 | A1 * | 10/2005 | Domany et al. | 707/1 |
| 2006/0212431 | A1 * | 9/2006 | Lapir et al. | 707/3 |

OTHER PUBLICATIONS

Ding, C.H.Q. et al. "A Min-max Cut Algorithm for Graph Partitioning and Data Clustering." in: Proceedings of the 2001 IEEE International Conference on Data Mining (San Jose CA, Nov. 29-Dec. 3, 2003), pp. 107-114. IEEE Computer Society, Washington, DC.
Dhillon, I.S. et al. "Information-Theoretic Co-clustering." in: Proceedings of the Ninth ACM SIGKDD International Conference on Knowledge Discovery and Data Mining (Washington DC, Aug. 24-27, 2003), pp. 89-98. ACM, New York, NY.
Dhillon, I.S. et al. "Co-clustering documents and words using Bipartite Spectral Graph Partitioning." in: Proceedings of the Seventh ACM SIGKDD International Conference on Knowledge Discovery and Data Mining (San Francisco CA, Aug. 26-29, 2001), pp. 269-274. ACM, New York, NY.

* cited by examiner

*Primary Examiner* — Rupal D Dharia
*Assistant Examiner* — Marie Georges Henry
(74) *Attorney, Agent, or Firm* — Fernandez & Associates, LLP

(57) ABSTRACT

A method for performing a network operation is disclosed. The method includes obtaining an association matrix representing association parameters between first entities and second entities of the network, generating a reduced matrix of the association matrix by aggregating the first entities into a reduced number of representative entities, partitioning a set containing the representative entities and the second entities into intermediate co-clusters based on a reduced-matrix based cohesiveness criterion, generating an expanded intermediate co-cluster from an intermediate co-cluster, partitioning the expanded intermediate co-cluster into final co-clusters based on an association-matrix based cohesiveness criterion, generating a profile of network activities based on the final co-clusters, and performing the network operation based on the profile of the network activities.

24 Claims, 8 Drawing Sheets

LEGEND:
Rectangular nodes: Leaf nodes
Circular nodes: Intermediate nodes
A (B;C) (D) inside node represnets:
A: cluster ID
B: number of users in cluster
C: number of website categories in cluster
D: cohesiveness metric

SYSTEM AND METHOD FOR CONTENT-AWARE CO-CLUSTERING ALGORITHM BASED ON HOURGLASS MODEL

BACKGROUND OF THE INVENTION

1. Field of the Invention

The present invention relates to computers and computer networks. More particularly, the invention relates to profiling network activities.

2. Background of the Related Art

Clustering refers to a partitioning method of the data points such that data points in the same cluster are similar to each other and the data points in different clusters are dissimilar. Simultaneously clustering columns and rows of large data matrix is referred to as co-clustering. Throughout this document, the terms "cluster" and "co-cluster" (or "clustering" and "co-clustering") may be used interchangeably.

Co-clustering techniques may be applied in a wide range of applications, such as document mining, micro-array analysis, and recommendation systems. For a data matrix of m rows and n columns, the time complexity of existing co-clustering, methods (e.g., information-theoretic co-clustering algorithm, matrix-decomposition based spectral clustering method, etc.) is usually in the order of m*n or higher. This limits applicability to data matrices involving a large number of columns and rows. Moreover, existing co-clustering methods requires that the entire data matrix needs to be held in the main memory during the entire co-clustering process. Other strong limitations of existing co-clustering methods includes requiring that the number of clusters in which the data-set is to be partitioned as a pre-determined parameter and that columns or rows of the data matrix cannot be shared across different clusters (referred to as hard co-clustering). It is often unrealistic in real-time applications to pre-determine the number of partitioned clusters because the hidden relationships within the data-set may not be known ahead of time.

SUMMARY

Generally speaking, the invention relates to the partitioning-based co-clustering algorithm, which partitions a data matrix D consisting of m rows and n columns into k co-clusters where each co-cluster represents a collection of rows and columns such as to optimize a pre-determined objective function that measure the quality of the co-clustering results.

The invention may be applied to many real-life applications involve large data matrices. For example, in text and web log analysis, the term-document data can be represented as contingency table. In biology domain, the gene expression data are organized in matrices with rows representing genes and columns representing experimental conditions. In recommendation systems, data is organized in matrices in which rows typically represent users and columns represent movies, songs, or generic items of interest. Typical applications of such techniques range from simultaneous clustering of genes and experimental conditions in bioinformatics, documents and words in text mining, users and movies in recommendation systems, etc.

Additional applications may include the following:

1. User browsing profile (Users on rows; websites on columns).

2. Gene expression patterns (genes on the rows; genes on the columns; each matrix element is a similarity metric).

3. DNA Microarray data (genes on the rows; sample from different tissues on the columns).

4. User account activity (different accounts on the rows; various metric on the columns). For example considering the accounts to be email accounts, the metrics may include inter-email time, email length, number of emails, etc.

5. Document classification (documents on rows; words on columns).

6. Grouping speakers with similar speech patterns (speakers on the rows; various speech metrics on the columns).

7. Content-based image retrieval (images on rows; image features on columns).

It is an objective of the invention to perform co-clustering in real time for word-document data-sets containing at least tens of thousands of articles and thousands of words.

It is an objective of the invention to perform co-clustering in real time (e.g., per hour) for the user profiling problem (i.e., users who have a similar webpage browsing behavior are grouped in individual clusters) requiring the matrix D to count more than a million users (as rows) and more than a million webpages (as columns).

Furthermore, the invention is contemplated to perform co-clustering in real time for high throughput microarray techniques to monitor the expression values of tens of thousands of genes under hundreds to thousands of experimental condition.

In general, in one aspect, the invention relates to a method for performing a network operation. The method includes obtaining an association matrix having a plurality of columns corresponding to a plurality of first entities in the network and a plurality of rows corresponding to a plurality of second entities in the network, wherein an element of the association matrix in a column corresponding to a first entity of the plurality of the first entities and in a row corresponding to a second entity of the plurality of the second entities represents an association parameter between the first entity and the second entity, generating a reduced matrix of the association matrix by aggregating the plurality of columns based on a pre-determined mapping from the plurality of the first entities into a plurality of representative entities, wherein an element of the reduced matrix in a column corresponding to a first representative entity of the plurality of the representative entities and in the row corresponding to the second entity of the plurality of the second entities represents an association parameter between the first representative entity and the second entity, partitioning, using a processor of a computer, a set comprising the plurality of representative entities and the plurality of second entities into a plurality of intermediate co-clusters based on a reduced-matrix based cohesiveness criterion; wherein an intermediate co-cluster of the plurality of intermediate co-clusters comprises one or more representative entities of the plurality of representative entities and one or more second entities of the plurality of the second entities, mapping the one or more representative entities to corresponding first entities within the plurality of first entities based on a reversal of the pre-determined mapping to generate an expanded intermediate co-cluster from the intermediate co-cluster; wherein the expanded intermediate co-cluster comprises the corresponding first entities and the one or more second entities, partitioning, using the processor of the computer, the expanded intermediate co-cluster into a plurality of final co-clusters based on an association-matrix based cohesiveness criterion, generating a profile of network activities based on the plurality of final co-clusters, and performing the network operation based on the profile of the network activities.

In general, in one aspect, the invention relates to a computer readable medium embodying instructions when executed by the computer to perform a network operation.

The instructions include functionality for obtaining an association matrix having a plurality of columns corresponding to a plurality of first entities in the network and a plurality of rows corresponding to a plurality of second entities in the network, wherein an element of the association matrix in a column corresponding to a first entity of the plurality of the first entities and in a row corresponding to a second entity of the plurality of the second entities represents an association parameter between the first entity and the second entity, generating a reduced matrix of the association matrix by aggregating the plurality of columns based on a pre-determined mapping from the plurality of the first entities into a plurality of representative entities, wherein an element of the reduced matrix in a column corresponding to a first representative entity of the plurality of the representative entities and in the row corresponding to the second entity of the plurality of the second entities represents an association parameter between the first representative entity and the second entity, partitioning, using a processor of a computer, a set comprising the plurality of representative entities and the plurality of second entities into a plurality of intermediate co-clusters based on a reduced-matrix based cohesiveness criterion; wherein an intermediate co-cluster of the plurality of intermediate co-clusters comprises one or more representative entities of the plurality of representative entities and one or more second entities of the plurality of the second entities, mapping the one or more representative entities to corresponding first entities within the plurality of first entities based on a reversal of the pre-determined mapping to generate an expanded intermediate co-cluster from the intermediate co-cluster; wherein the expanded intermediate co-cluster comprises the corresponding first entities and the one or more second entities, partitioning, using the processor of the computer, the expanded intermediate co-cluster into a plurality of final co-clusters based on an association-matrix based cohesiveness criterion, generating a profile of network activities based on the plurality of final co-clusters, and performing the network operation based on the profile of the network activities.

In general, in one aspect, the invention relates to a system for performing a network operation. The system includes a processor and memory storing instructions when executed by the processor including functionalities for obtaining an association matrix having a plurality of columns corresponding to a plurality of first entities in the network and a plurality of rows corresponding to a plurality of second entities in the network, wherein an element of the association matrix in a column corresponding to a first entity of the plurality of the first entities and in a row corresponding to a second entity of the plurality of the second entities represents an association parameter between the first entity and the second entity, generating a reduced matrix of the association matrix by aggregating the plurality of columns based on a pre-determined mapping from the plurality of the first entities into a plurality of representative entities, wherein an element of the reduced matrix in a column corresponding to a first representative entity of the plurality of the representative entities and in the row corresponding to the second entity of the plurality of the second entities represents an association parameter between the first representative entity and the second entity, partitioning, using a processor of a computer, a set comprising the plurality of representative entities and the plurality of second entities into a plurality of intermediate co-clusters based on a reduced-matrix based cohesiveness criterion; wherein an intermediate co-cluster of the plurality of intermediate co-clusters comprises one or more representative entities of the plurality of representative entities and one or more second entities of the plurality of the second entities, mapping the one or more representative entities to corresponding first entities within the plurality of first entities based on a reversal of the pre-determined mapping to generate an expanded intermediate co-cluster from the intermediate co-cluster; wherein the expanded intermediate co-cluster comprises the corresponding first entities and the one or more second entities, partitioning, using the processor of the computer, the expanded intermediate co-cluster into a plurality of final co-clusters based on an association-matrix based cohesiveness criterion, generating a profile of network activities based on the plurality of final co-clusters, and performing the network operation based on the profile of the network activities.

Other aspects and advantages of the invention will be apparent from the following description and the appended claims.

DETAILED DESCRIPTION

Figure 1:
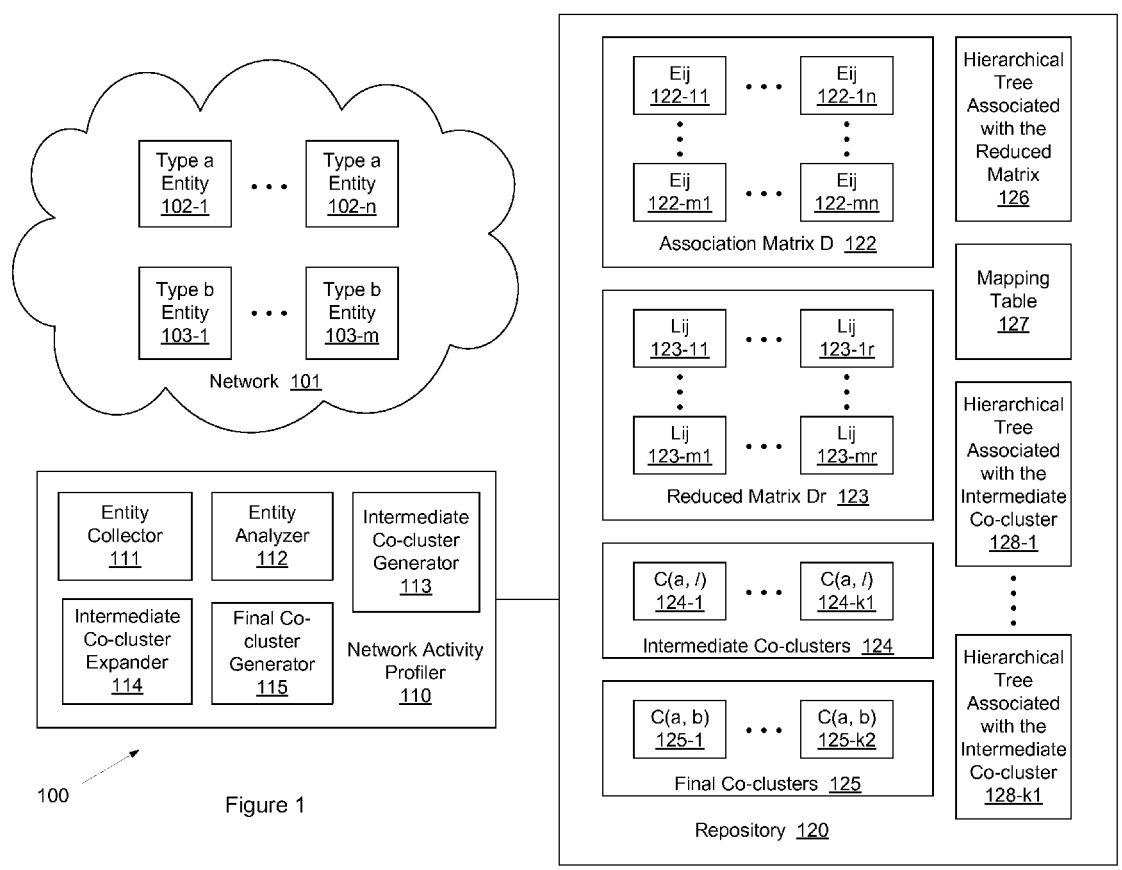
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, the invention relates to a content-aware co-clustering algorithm based on hourglass model that generates soft co-clusters from large data-sets by cascading a series of dimensionality reduction and dimensionality expansion stages, interleaved by a co-clustering algorithm based on Bipartite Spectral Graph Partitioning. Examples of the dimensionality reduction and expansion stages includes building a subject taxonomy for a library catalog system (i.e., reduction stage) and assigning books to the taxonomy (i.e. expansion stage). As a result, the co-clustering algorithm process a smaller data-set than the original data-set at each iteration thus reducing memory requirement for the system. Furthermore, content-aware co-clustering algorithm based on hourglass model automatically identifies the optimal number of clusters to be used during the data partitioning process.

Generally speaking, the invention further relates to profiling a network activities based on the soft co-clusters generated by the content-aware co-clustering algorithm based on hourglass model and performing network operations based on the profile of the network activities.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes a network (101), a network activity profiler (110), and a repository (120). The network (101) may be any types of network, such as the Internet, intranet, etc. including wired and wireless sections based on electrical, optical, or other data transmission media. The term "network" may be used in this document to refer to nodes, links, data or control information, hardware/software components, equipments, users, or other physical/logical infrastructures associated with interconnected computing devices. As shown, the network (101) includes entities of various types, such as type a entities (102-1 through 102-*n*) and type b entities (103-1 through 103-*m*) where n and m are integers representing number of entities of type a and type b, respectively. Examples of type a entities (102-1 through 102-*n*) may include webpage (or website), account metric (e.g., of an email account), word (e.g., contained in a document captured from the network), VoIP speech metric, image feature (e.g., contained in an image captured from the network), etc. Examples of type b entities (103-1 through 103-*m*) may include user (e.g., browsing the webpage), account user (e.g., of the email account), document (e.g., captured from the network that contains the word), speaker (e.g., of the VoIP speech), image (e.g., captured from the network that contains the image feature), etc.

Further as shown in FIG. 1, the repository (120) stores an association matrix D (122), a reduced matrix Dr (123), intermediate co-clusters (124), co-clusters (125), a hierarchical tree associated with the reduced matrix (126), a mapping table (127), and hierarchical trees associated with the intermediate co-cluster (128-1 through 128-*k*1).

In one or more embodiments of the invention, the association matrix D (122) represents associations between the type a entities (102-1 through 102-*n*) and the type b entities (103-1 through 103-*m*) by including association parameters Eij (122-11 through 122-*mn*) arranged in m rows (e.g., the first row Eij (122-11 through 122-1*n*), the m-th row Eij (122-*m*1 through 122-*mn*), etc.) and n columns (e.g., the first column Eij (122-11 through 122-*m*1), the n-th column Eij (122-1*n* through 122-*mn*), etc.) where each association parameter Eij (122-*ij*) represents an association between the j-th type a entity and the i-th type b entity. For example, each association parameter Eij may represent a frequency of a webpage (or website) viewed by a user, an account metric (e.g., of an email account) activated by an account user, a word detected in a document captured from the network, a VoIP speech metric detected in a speaker's speech, an image feature detected in an image captured from the network, etc. Although matrix columns of are depicted vertically and matrix rows are depicted horizontally in FIG. 1, one skilled in the art will appreciate that matrix columns may be horizontal and the matrix rows may be vertical without deviating from the spirit of the invention.

In one or more embodiments of the invention, the mapping table (127) includes mapping relationships to map (e.g., categorize) the type a entities (102-1 through 102.*n*) into r representative entities (e.g., categories) where r is an integer. For example, the representative entities may include categories of webpages (e.g., dating, music, news, trading, social networking, etc.), categories of account metric (e.g., usage frequency, data usage volume, diversity of contacts, etc.), categories of word (e.g., English, French, medical related, finance related, technology related, etc.), categories of VoIP speech metric (e.g., high quality, low quality, male voice, female voice, English speaking, French speaking, etc.), categories of image feature (e.g., high resolution, low resolution, monochrome, full color, etc.), etc.

In one or more embodiments of the invention, the reduced matrix Dr (123) represents associations between the r representative entities and the type b entities (103-1 through 103-*m*) by including association parameters Lij (123-11 through 123-*mr*) arranged in m rows and r columns (e.g., the first row Lij (123-11 through 123-1*r*), the m-th row Lij (123-*m*1 through 123-*mr*), etc.) and r columns (e.g., the first column Lij (123-11 through 123-*m*1), the r-th column Lij (123-1*r* through 123-*mr*), etc.) where each association parameter Lij (123-*ij*) represents an association between the r-th representative entity and the i-th type b entity. For example, each association parameter Lij may represent a frequency of a category of webpage (or website) viewed by a user, a category of account metric (e.g., of an email account) activated by an account user, a category of word detected in a document captured from the network, a category of VoIP speech metric detected in a speaker's speech, a category of an image feature detected in an image captured from the network, etc.

In one or more embodiments of the invention, the hierarchical tree associated with the reduced matrix (126) is a tree of co-clusters generated by partitioning a set containing the r representative entities (not shown) and the m type b entities (103-1 through 103-*m*). For example, a node (i.e., a co-cluster) of the hierarchical tree associated with the reduced matrix (126) may include one or more representative entities and one or more of the type b entities. In one or more embodiments, the set is partitioned by dividing each leaf node (i.e., leaf co-cluster) of the tree recursively based on a pre-determined criterion. When the recursive divisions are completed, all leaf co-clusters (denoted as C(a, l) (124-1 through 124-*k*1) based on a context of referring to the representative entities as/type entities) of the resultant tree are assigned as intermediate co-clusters (124). For example, there are total of k1 intermediate co-clusters s shown in FIG. 1.

In one or more embodiments of the invention, each co-cluster (e.g., C(a, l) (124-1)) of the intermediate co-clusters (124) is mapped into an expanded intermediate co-cluster (not shown) by reverse mapping the representative entities in each co-cluster (e.g., C(a,l) (124-1)) back to corresponding type a entities based on a reversal of the mapping table (127).

In one or more embodiments of the invention, a hierarchical tree (e.g., each of 128-1 through 128-*k*1) is associated with each expanded intermediate co-cluster. In one or more embodiments, each hierarchical tree associated with the expanded intermediate co-cluster (e.g., each of 128-1 through 128-*k*1) is a tree of co-clusters generated by partitioning one of the intermediate co-clusters (124). For example, a node (i.e., a co-cluster) of the hierarchical tree associated with the expanded intermediate co-cluster (128-1) may include one or more type a entities corresponding to a portion of the representative entities contained in the intermediate co-cluster C(a, l) (124-1) and a portion of the type b entities contained in the intermediate co-cluster C(a, l) (124-1). In one or more embodiments, the set is partitioned by dividing each leaf node (i.e., leaf co-cluster) of the tree recursively based on a pre-determined criterion. When the recursive divisions are completed, all leaf co-clusters (denoted as C(a, b) (125-1 through 125-*k*2)) of the resultant tree are assigned as final co-clusters to be included in the final co-clusters (125). For example, there are total of k2 final co-clusters generated by partitioning all of the intermediate co-clusters (124) shown in FIG. 1.

Further as shown in FIG. 1, the network profiler (110) includes an entity collector (11), an entity analyzer (112), an intermediate co-cluster generator (113), an intermediate co-clusters expander (114), and a co-cluster generator (115).

In one or more embodiments of the invention, the entity collector (111) is configured to collect entities in the network (101) such as the type a entities (102-1 through 102-*n*), the type b entities (103-1 through 103-*m*).

In one or more embodiments of the invention, the entity analyzer (112) is configured to generate the association matrix D (122) and the reduced matrix Dr (123) based on the entities in the network (101) collected by the entity collector (111).

In one or more embodiments of the invention, the intermediate co-cluster generator (113) is configured to generate the intermediate co-clusters (124) based on the reduced matrix Dr (123) generated by the entity analyzer (112). More details of the intermediate co-cluster generator (113) operations are described in reference to the method described in FIG. 2 and the example depicted in FIGS. 3A-3D below.

In one or more embodiments of the invention, the intermediate co-cluster expander (114) is configured to generate the expanded intermediate co-clusters (not shown) from the intermediate co-clusters (124) generated by the intermediate co-cluster generator (113). More details of the intermediate co-cluster expander (114) operations are described in reference to the method described in FIG. 2 and the example depicted in FIGS. 3A-3D below.

In one or more embodiments of the invention, the final co-cluster generator (115) is configured to generate the final co-clusters (125) from the expanded intermediate co-clusters (not shown) generated by the intermediate co-cluster expander (114). More details of the final co-cluster generator (115) operations are described in reference to the method described in FIG. 2 and the example depicted in FIGS. 3A-3D below.

Figure 2A:
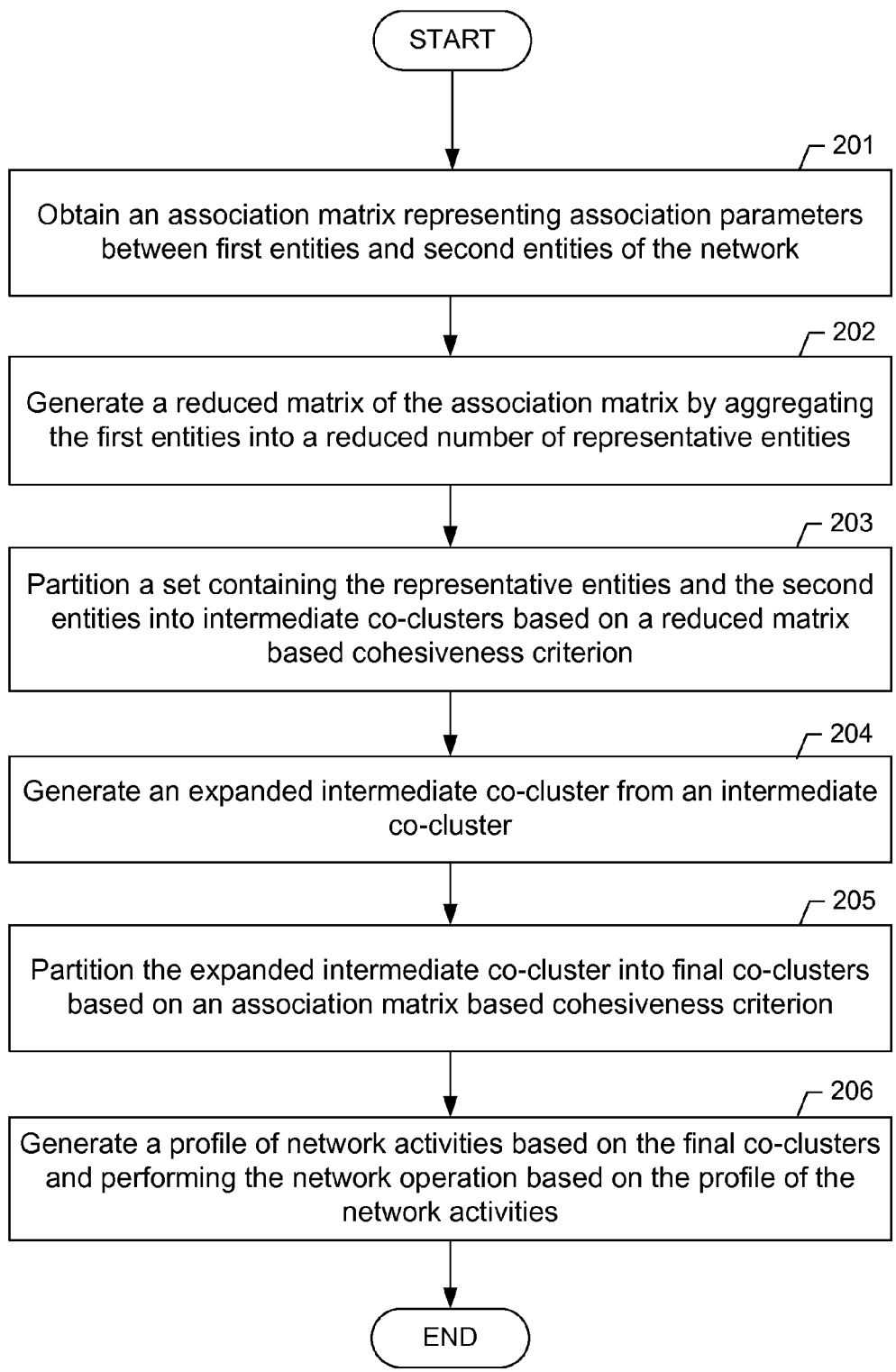
FIGS. 2A and 2B show a flowchart of a method according to aspects of the invention.
Figure 2B:
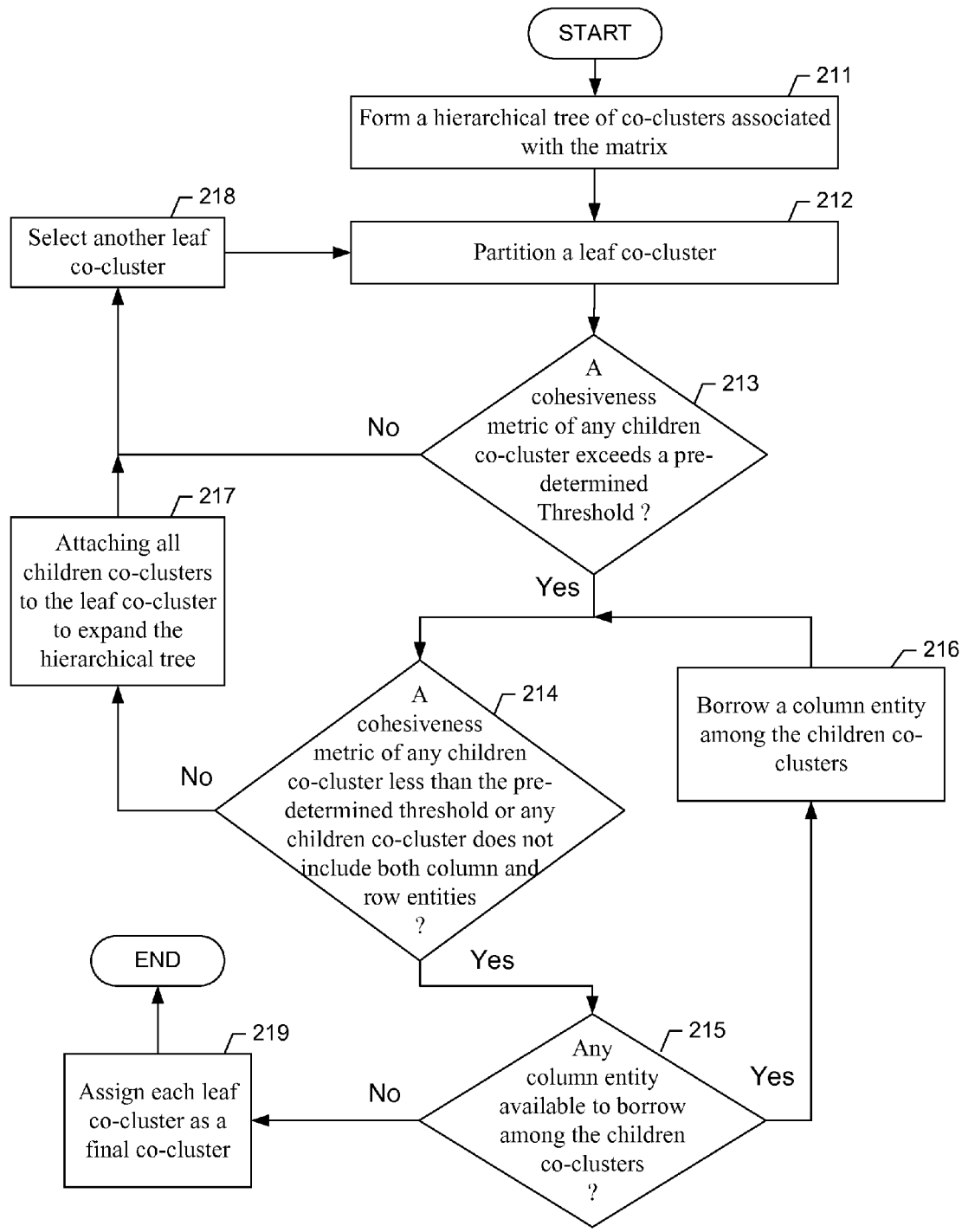

FIGS. 2A and 2B depict a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments of the invention, the method depicted in FIGS. 2A and 2B may be practiced using system (100) described with respect to FIG. 1 above.

FIG. 2A depicts a method of content-aware co-clustering based on a hourglass model as applied to association matrix of association parameters representing duality of network entities. Initially in Step 201, an association matrix is obtained that has columns corresponding to first entities in the network and rows corresponding to second entities in the network. In one or more embodiments of the invention, an element of the association matrix in a column corresponding to a first entity and in a row corresponding to a second entity represents an association parameter between the first entity and the second entity. Examples of the network, first and second entities (or column entities and row entities), and the association parameters (e.g., Eij) are described in reference to the system (100) of FIG. 1 above and the example depicted in FIGS. 3A-3D below.

In Step 202, a reduced matrix of the association matrix is generated by aggregating the columns based on a pre-determined mapping from the first entities into representative entities. In one or more embodiments of the invention, an element of the reduced matrix in a column corresponding to a first representative entity and in the row corresponding to the second entity represents an association parameter between the first representative entity and the second entity. Examples of the representative entities and the reduced matrix are described in reference to the system (100) of FIG. 1 above and the example depicted in FIGS. 3A-3D below.

In Step 203, a set containing the representative entities and the second entities is partitioned into intermediate co-clusters based on a reduced-matrix based cohesiveness criterion. In one or more embodiments of the invention, the partitioning is performed using a processor of a computer, such as described in reference to FIG. 4 below. In one or more embodiments, an intermediate co-cluster contains one or more representative entities and one or more second entities. Examples of the intermediate co-clusters and the reduced-matrix based cohesiveness criterion are described in reference to the system (100) of FIG. 1 above and the example depicted in FIGS. 3A-3D below. Further, an example partitioning algorithm is described in reference to FIG. 2B below.

In Step 204, the one or more representative entities contained in the intermediate co-cluster is mapped to corresponding first entities. In one or more embodiments of the invention, the mapping is based on a reversal of the pre-determined mapping to generate an expanded intermediate co-cluster from the intermediate co-cluster. For example, the expanded intermediate co-cluster contains the corresponding first entities and the one or more second entities contained in the intermediate co-cluster. Examples of the expanded intermediate co-cluster are described in reference to the system (100) of FIG. 1 above and the example depicted in FIGS. 3A-3D below.

In Step 205, the expanded intermediate co-cluster is partitioned, using the processor of the computer, into final co-clusters based on an association-matrix based cohesiveness criterion. In one or more embodiments of the invention, the final co-clusters are soft co-clusters. Examples of the final co-clusters and the association-matrix based cohesiveness criterion are described in reference to the system (100) of FIG. 1 above and the example depicted in FIGS. 3A-3D below. Further, an example partitioning algorithm is described in reference to FIG. 2B below.

In Step 206, a profile of network activities is generated based on the final co-clusters and the network operation is performed based on the profile of the network activities. Examples of profiling network activities may include profiling individuals' email account activities or social networking activities. Examples of performing the network operation may include configuring the email and/or social network accounts to optimize performance and/or resource utilization according to the determined profiles.

For example, the network data-sets may be organized into a matrix with user email accounts relates to the matrix rows and several email features (e.g., frequency of sending email, frequency of receiving email, number of people in his contact list, length of the emails, etc.) relates to the matrix columns. Accordingly, the user email accounts may be configured with appropriate resources (e.g., capacity, bandwidth, etc.) and performance.

In another example, the data-sets may be organized into a matrix with user social network accounts relates to the matrix rows and several features (e.g., frequency of posting a message, frequency of contacting a friend, frequency of adding a new friend, etc.) relates to the matrix columns. Accordingly, the user accounts may be configured with appropriate resources (e.g., capacity, bandwidth, etc.) and performance.

FIG. 2B depicts a matrix partitioning algorithm. In first embodiments of the invention, the matrix partitioning algorithm depicted in FIG. 2B may be used, in Step 203 of FIG. 2A, to partition the set containing the first and second entities of the network into intermediate co-clusters in a reduction stage. In second embodiments of the invention, the matrix partitioning algorithm depicted in FIG. 2 may be used, in Step 205 of FIG. 2A, to partition an expanded intermediate co-cluster into final co-clusters in an expansion stage.

Initially in Step 211, a hierarchical tree of co-clusters is formed. In first embodiments of the invention, the hierarchical tree is associated with the reduced matrix of Step 202 of FIG. 2A and formed based on the set containing the first and second entities. In second embodiments of the invention, the hierarchical tree is associated with the expanded intermediate co-cluster of Step 204 of FIG. 2A and is formed based on the corresponding first entities and the one or more second entities contained in the expanded intermediate co-cluster. Examples of the hierarchical tree of co-clusters are described in reference to the system (100) of FIG. 1 above and the example depicted in FIGS. 3A-3D below.

In Steps 212 through 218, a leaf co-cluster of the hierarchical tree is partitioned, using the processor of the computer, to expand the hierarchical tree. In first embodiments of the invention, a cohesive metric used in the partitioning algorithm is a reduced-matrix based cohesiveness metric. In second embodiments of the invention, a cohesive metric used in the partitioning algorithm is an association-matrix based cohesiveness metric. Examples of the reduced-matrix based cohesiveness metric and the association-matrix based cohesiveness metric are described in reference to FIGS. 3A-3D below.

In Step 212, a leaf co-cluster is partitioned. In one or more embodiments of the invention, the partition is performed using a bi-cut algorithm. Examples of the bi-cut algorithm are described in reference to the example depicted in FIGS. 3A-3D below. In one or more embodiments, the leaf co-cluster is partitioned only when the leaf co-cluster contains at least two representative entities and at least two second entities.

In Step 213, a determination is made as to whether a cohesive metric of any children co-cluster exceeds a pre-determined threshold.

In one or more embodiments of the invention, the cohesiveness metric of a children co-cluster is defined as a ratio of a sum of weights of (column entity, row entity) pairs within the children co-cluster to a sum of weights of (column entity, row entity) pairs within the leaf co-cluster that originates from the children co-cluster while each of the weights is determined from a corresponding element in the matrix. As noted above, examples of the reduced-matrix based cohesiveness metric and the association-matrix based cohesiveness metric are described in reference to FIGS. 3A-3D below.

If the determination made in Step 213 is no, the method proceeds to Step 218 where another leaf co-cluster is selected to be partitioned in Step 212.

If the determination made in Step 213 is yes, the method proceeds to Step 214 where a determination is made as to whether a cohesiveness metric of any children co-cluster is less than the pre-determined threshold or whether any children co-cluster does not include both column and row entities. In first embodiments of the invention, the column and row entities are representative entities and second entities, respectively. In second embodiments of the invention, the column and row entities are first entities corresponding to the representative entities and second entities, respectively.

If the determination made in Step 214 is no (said in other words, all children co-clusters have the cohesiveness metric exceeding the pre-determined threshold and include both column and row entities), the method proceeds to Step 217 where all children co-clusters are attached to the leaf co-cluster to expand the hierarchical tree. In so doing, the leaf co-cluster is no longer a leaf node of the tree while the children co-clusters are now new leaf nodes (or leaf co-clusters). Subsequently, the method proceeds to Step 218.

If the determination made in Step 214 is yes (said in other words, at least one children co-clusters has the cohesiveness metric less than the pre-determined threshold or does not include both column and row entities), the method proceeds to Step 215 where a determination is made as to whether any column entity is available to borrow among the children co-clusters (i.e., the sibling co-clusters).

If the determination made in Step 215 is yes, the method proceeds to Step 216 where a column entity is borrowed among the children co-clusters. In one or more embodiments of the invention, a column entity is borrowed from a children co-cluster with cohesiveness metric exceeding the pre-determined threshold and added to another children co-cluster with cohesiveness metric less than the pre-determined threshold. In one or more embodiments of the invention, a column entity is borrowed from a children co-cluster with cohesiveness metric exceeding the pre-determined threshold and added to another children co-cluster with cohesiveness metric less than the pre-determined threshold.

If the determination made in Step 215 is no, the method proceeds to Step 219 where each leaf co-cluster present in the hierarchical tree is assigned as one of the final co-clusters.

FIGS. 3A-3D show an example according to aspects of the invention. In one or more embodiments of the invention, the example may be based on the method depicted in FIG. 2 and the system (100) described with respect to FIG. 1 above.

Generally speaking, the content-aware co-clustering algorithm based on hourglass model first reduces the size of the initial data matrix by aggregating original columns into a smaller number of columns corresponding to representative entities, partitions the reduced matrix, and then expands to re-construct each partition based on the original columns. As noted above, content-aware co-clustering algorithm based on hourglass model implements a novel reduction and expansion model that keeps intact the affinities among entities of the original data-set. For example, in the context of the user-interest extraction problem (i.e., user browsing behavior profiling) in which users are represented as rows of the matrix D while weblinks browsed by users are represented as columns of the matrix D, content-aware co-clustering algorithm based on hourglass model first groups the hundreds of thousands of distinct columns into a few tens of categories that are content-wise very similar to each other. For example, two distinct weblinks such as amazon.com and ebay.com are aggregated into one single category of interest "E-Commerce". The new lower-dimensionality matrix $D_r$ (i.e., the reduced matrix) is then processed by co-clustering of rows and columns of $D_r$ in search for users browsing similar categories of interest (or categories). Let's assume that at the end of this step, content-aware co-clustering algorithm based on hourglass model generates k co-clusters in a collection C, i.e., $C=\{c_1, c_2, \ldots, c_k\}$ from $D_r$. In order to understand whether two users belong to the same cluster $c_i$ with $i \in 1, 2, \ldots, k$ has different browsing behavior at the weblink level, each cluster $c_i$ is further analyzed independently (i.e., separately from other clusters $c_j$ with $j \in 1, 2, \ldots, k$ and $j>$ or $<i$). The categories of each cluster $c_i$ are expanded back to weblinks previously aggregated in such categories to generate a expanded matrix $D_e(i)$. Content-aware co-clustering algorithm based on hourglass model then executes the co-clustering algorithm on the expanded matrices $D_e(i)$. Let's assume that for each cluster $c_i$ the algorithm finds θ(i) co-clusters. At the end of this process, content-aware co-clustering algorithm based on hourglass model outputs these k coarse co-cluster of users and categories as well as the $\Sigma^k_{i=1} \theta(i)$ fine co-clusters of users and weblinks. The sequential cascading of operations, i.e., dimensionality reduction of original matrix D, the data partitioning into the k coarse co-clusters executed on the reduced-size matrix $D_r$, the subsequent expansion of each coarse co-cluster $c_i$ and the data partitioning executed on each of such coarse co-clusters is referred to as the hourglass model.

In order to remove the dependency of having the user to specify the number k of clusters in which the input data-set has to be partitioned, content-aware co-clustering algorithm based on hourglass model uses an automatic mechanism to determine the number k. This is accomplished by employing a recursive hierarchical partitioning of the data-set in a divisive (or top-down) manner to generate a hierarchical tree of clusters. The automatic mechanism starts with the entire data-set as one single cluster and ends when k clusters are found as leaf nodes of the hierarchical tree. Throughout this document, a node represents a cluster and a cluster is represented by a node, therefore, the term "cluster" and "node" may be used interchangeably depending on the context. In an example, at each iteration step, content-aware co-clustering algorithm based on hourglass model processes a node obtained in the previous step as a parent node into two children nodes to form a binary-tree. In case the two children nodes satisfy specific optimality criteria, then the split is accepted and each children node is further processed in the next step. Otherwise the split is not accepted (i.e., deleted) and the parent node is closed as a leaf node. At the end of this process, the cardinality of the children nodes being found (i.e., the number of the leaf nodes) represents the number of clusters (i.e., k) in which content-aware co-clustering algorithm based on hourglass model has partitioned the original data-set.

Content-aware co-clustering algorithm based on hourglass model can partition the original data-set either operating a hard co-clustering or a more sophisticated soft co-clustering. The soft co-clustering is executed by enabling at each step a children node to borrow column-entities (i.e., columns of the matrix being provided as the input of the co-clustering process) from the other children node. Which columns to be borrowed and the number of columns that are allowed to be borrowed are dictated by an internal mechanism described later.

Mathematically, a graph G=(V, E) is a set of vertices V={1, 2, ..., |V|} and a set of edges {i, j} each with edge weight $E_{ij}$. The adjacency matrix M of a graph is defined by $M_{ij}=E_{ij}$, if the edge {i, j} exists in the graph G $M_{ij}=0$, if the edge {i, j} does not exist in the graph G  (1)

Given a partitioning of the vertex set V into two subsets $V_1$ and $V_2$, the cut between such partitioning (i.e., between $V_1$ and $V_2$) is defined as:

$$\text{cut}(V_1, V_2) = \sum_{i \in V_1, j \in V_2} M_{ij} \quad (2)$$

The cut between k vertex subsets is defined as:

$$\text{cut}(V_1, V_2, \ldots, V_k) = \sum_{i<j} \text{cut}(V_i, V_j) \quad (3)$$

An example bipartite graph model for representing a user-webpage collection for profiling user browsing activities is described below.

An undirected bipartite graph is defined as a triple G=(U, W, E) where U={$u_1, u_2, \ldots, u_m$} and W={$w_1, w_2, \ldots, w_n$} are two sets of vertices and E is the set of edges E={{$u_i,w_j$}: $u_i \in U, w_j \in W$}}. For example, U is the set of users and W is the set of webpages the users browsed in a given temporal snapshot. An edge {$u_i,w_j$} exists if the user $u_i$ browses the webpages $w_j$ at least once during such temporal snapshot; note that the edges are undirected. In this example, there are no edges between users or between webpages as implied by the graph being a bipartite graph.

An edge signifies an association between a user and a webpage. By putting positive weights on the edges, we can capture the strength of this association. One possibility is to have edge-weights equal term frequencies. For example, let's assume that $s_{ij}$ represents the number of accesses of user $u_i$ to the webpage $w_j$. Then, $E_{ij}=s_{ij}/(\Sigma_{j=1,\ldots,m} s_{ij})$ where $\Sigma_{j=1,\ldots m} E_{ij}=1$.

In the context of FIGS. 1 and 2A-2B, U, W, E, $E_{ij}$ correspond to the row entity, column entity, (row entity, column entity) pair, and association parameter.

Consider the m*n user-webpage matrix D such that D, equals the edge-weight $E_{ij}$. It can be shown that the adjacency matrix M of the bipartite graph has the size (m+n)*(m+n) and may be written as $$M = \begin{pmatrix} 0 & D \\ D^T & 0 \end{pmatrix} \quad (4)$$

where we have ordered the vertices such that the first m vertices index the users while the last n index the webpages.

In the example user browsing profiling, it can be observed that a duality exists between user clustering and webpage clustering, i.e., user clustering induces webpage clustering while webpage clustering induces user clustering.

Given disjoint webpage clusters $c_1^{(w)}, \ldots, c_k^{(w)}$ the corresponding user clusters $c_1^{(u)}, \ldots, c_k^{(u)}$ may be determined as follows. A given user belongs to the user cluster $c^{(u)}_l$ if its association with the webpage cluster $c_l^{(w)}$ is greater than its association with any other webpage cluster. Using our graph model, a natural measure of the association of a user with a webpage cluster is the sum of the edge-weights to all webpages in the cluster. Thus, $$c_l^{(u)} = \left\{ u_i : \sum_{j \in c_l^{(w)}} D_{ij} \geq \sum_{j \in c_h^{(w)}} D_{ij}, \forall h = 1, \ldots, k \right\} \quad (5)$$

Thus, each of the user clusters is determined by the webpage clustering. Similarly, given user clusters $c_1^{(u)}, \ldots, c_k^{(u)}$ the induced webpage clustering is given by $$c_l^{(w)} = \left\{ w_j : \sum_{i \in c_l^{(u)}} D_{ij} \geq \sum_{i \in c_h^{(u)}} D_{ij}, \forall h = 1, \ldots, k \right\} \quad (6)$$

Note that this characterization is recursive in nature since webpage clusters determine user clusters, which in turn determine improved webpage clusters. In an example, a target user and webpage clustering correspond to a partitioning of the graph such that the crossing edges between partitions have minimum weight. This is achieved when $$\text{cut}(c_1^{(u)} \cup c_1^{(w)}, \ldots, c_k^{(u)} \cup c_k^{(w)}) = \min_{V_1,\ldots,V_k} \text{cut}(V_1, \ldots, V_k) \quad (7)$$

where $v_1, v_2, \ldots, v_k$ is any k-partitioning of the bipartite graph M representing the aforementioned user-webpage collection for profiling user browsing activities.

For example, the spectral graph bi-partitioning algorithm may be combined with the hourglass model to generate such partitions having minimum weight and soft co-clusters without requiring the number of partitions k as an input parameter.

Details of such example algorithm are described below.

Consistent with the description above, the following description is based on users set $U=\{u_1, u_2, \ldots, u_m\}$ with cardinality $|U|=m$, webpages set $W=\{w_1, w_2, \ldots, w_n\}$ with cardinality $|W|=n$, and matrix D of size m*n that captures the associations between users and webpages. As noted above, $E_{ij}=s_{ij}/(\Sigma_{j=1,\ldots,n} s_{ij})$ represents the number of observed accesses from user $u_i$ to webpage $w_j$ during an observation time window and that $\Sigma_{j=1,\ldots,m} E_{ij}=1$. Furthermore, the entire space of webpages is mapped to a set of $L=\{l_1, l_2, \ldots, l_l\}$ macro categories with cardinality $|L|=l$ such that each webpage is mapped to one and only one category in the set L.

Before embarking ourselves in the description of the content-aware co-clustering algorithm based on hourglass model, let's briefly spend a few words on the notation In the description below, the terms $C^{(u,l)}=\{c^{(u,l)}_1, \ldots, c^{(u,l)}_k\}$ and $C^{(w,l)}=\{c^{(w,l)}_1, \ldots, c^{(w,l)}_k\}$ are used to refer to co-clusters generated by the content-aware co-clustering algorithm based on hourglass model from a data matrix that provides associations between users and categories (i.e., pair (u,l)) or users and webpages (i.e., pair (u,w)). Each $c_h^{(a,b)}$ represents the set of entities a and b being grouped together into the co-cluster h. For example, in the context of user-categories, each co-cluster $c_j^{(u,l)}$ is composed by users represented by $c_j^{(u)}$ in U and categories represented by $c_j^{(l)}$ in L. In the context of user-webpages, each $c_j^{(u,w)}$ is composed by users represented by $c_j^{(u)}$ in U and webpages represented by $c_j^{(w)}$ in W.

Assuming that at each of the iterations, content-aware co-clustering algorithm based on hourglass model partitions a parent node into k children nodes. Let $c^{(a,b)}$ be the parent node, while $c^{(a,b)}_i$ with i in $1, \ldots, k$ be the children nodes. With this notation, the sets of entities a and b being grouped together in cluster $c_i^{(a,b)}$ are referred to as $c_i^{(a)}$ and $c_i^{(b)}$, respectively, that is to say that the cluster $c_i^{(a,b)}$ is a union of the set $c_i^{(a)}$ of entities a and the set $c_i^{(b)}$ of entities b, or $c_i^{(a,b)}=\{c_i^{(a)}, c_i^{(b)}\}$. The cluster cohesiveness metric of a children co-cluster $c_i^{(a,b)}$, denoted with $\gamma_i^{(a,b)}$ is then defined as the ratio of the sum of the weights of links (i.e., edges) between the sets $c_i^{(a)}$ and $c_i^{(b)}$ (i.e., links that remain inside a co-cluster) to the sum of the weights of all the links that originates from $c_i^{(a)}$.

In mathematical terms, the cohesiveness of cluster $c_i^{(a,b)}$ is represented as $$\gamma_i^{(a,b)} = \frac{\sum_{h \in c_i^{(a)}} \sum_{k \in c_i^{(b)}} D_{hk}}{\sum_{h \in c_i^{(a)}} \sum_{k \in C^{(b)}} D_{hk}} \quad (8)$$

where $C^{(b)}=\{c_i^{(b)}\}$ represents the entire space of entities b across all k sibling nodes of $c_i^{(a,b)}$ with i ranging from 1 through k. $D_{hk}$ represents the weight of the link (i.e., edge weight) between an entity (denoted by h) in $c_i^{(a)}$ and another entity (denoted by k) in $c^{(b)}$.

TABLE 1

FUNCTION: PHANTOM(U, W, D, L, $T_c$)

| | |
|---|---|
| 1: | /* Initialization */ |
| 2: | $\Delta = \{\}, \theta = 0$ |
| 3: | /* Dimensionality Reduction: $D_r$ is of size m × l with l << n */ |
| 4: | $D_r \leftarrow D$; |
| 5: | /* Co-Cluster Executed on Low-Dimensionality Matrix $D_r$ */ |
| 6: | $(C^{(u,l)}, k) = \text{KernelPhantom}(U, L, D_r, T_c)$; |
| 7: | for j = 1to k do |
| 8: | /* Dimensionality Expansion: $c_j^{(u,l)} \in C^{(u,l)}$ are expanded to consider webpages */ |
| 9: | $c_j^{(u,\tilde{w})} \leftarrow c_j^{(u,l)}$ |
| 10: | $D_e(j) \leftarrow c_j^{(u,\tilde{w})}$ |
| 11: | /* Co-Cluster Executed on each $D_e$ (j) independently */ |
| 12: | $(C^{(u,w)}(j), \theta(j)) = \text{KernelPhantom}(c_j^{(u)}, c_j^{(w)}, D_e(j)T_c)$; |
| 13: | /* Output Preparation: Construction of set $\Delta$ of cardinality $\theta$ */ |
| 14: | $\Delta = \cup_{j=1,\ldots,k} C_j^{(u,w)}$; |
| 15: | $\theta = \Sigma_{j=1}^{k} \theta(j)$ |
| 16: | return $(\Delta, \theta)$; |

TABLE 1 shows an example content-aware co-clustering algorithm based on hourglass model that is referred to as PHANTOM. PHANTOM may be viewed as an example of the method depicted in FIG. 2A. In particular, TABLE 1 shows the hourglass model used by the algorithm. First, the algorithm reduces the dimensionality of the problem by addressing the cardinality of the column space (i.e., webpages) captured by the original matrix D, which may be viewed as an example of the association matrix D (122) of FIG. 1. It transforms the large size webpage space of cardinality n into the lower dimensionality category space $D_r$ of size m*l with l<<n, which may be viewed as an example of the reduced matrix Dr (123) of FIG. 1. It does it by grouping semantically similar webpages into the same category (i.e., representative entity) via keyword mining over the webpage URL. We distinguish the following categories: dating, gaming, mail, maps, MMS, music (e.g., including both music downloads as well as streaming music), news, photo, ringtones, search, social networking, trading, travel, video, and weather. A comprehensive list of the classification rules we employ is provided in TABLE 2, which may be viewed as an example of the mapping table (127) of FIG. 1. Some keywords (e.g., google, yahoo, and msn) represent portals from where users can access different services (e.g., e-mail or search). Hence, in order to distinguish between e-mail (keyword: mail) and search (keywords: google, yahoo, msn) we apply the mail rule first.

TABLE 2

Mapping 16 column entities to 5 representative entities

| Symbol | Website | Category |
|---|---|---|
| A | weather.com | WEATHER |
| B | accuweather.com | WEATHER |
| C | customweather.com | WEATHER |
| D | weather.yahoo.com | WEATHER |
| E | weather.gov | WEATHER |
| F | facebook.com | SOCIAL-NETWORKING |
| G | myspace.com | SOCIAL-NETWORKING |
| H | twitter.com | SOCIAL-NETWORKING |
| I | mail.yahoo.com | MAIL |
| J | hotmail.com | MAIL |

TABLE 2-continued

Mapping 16 column entities to 5 representative entities

| Symbol | Website | Category |
|---|---|---|
| K | gmail.com | MAIL |
| L | webmail.aol.com | MAIL |
| M | amazon.com | E-COMMERCE |
| N | ebay.com | E-COMMERCE |
| P | chemistry.com | DATING |
| Q | match.com | DATING |

Next, content-aware co-clustering algorithm based on hourglass model solves the co-clustering problem associated to the matrix $D_r$ by calling an inner function called KERNELPHANTOM (an example of the algorithm of FIG. 2B) that receives as an input the two sets of entities it has to co-cluster together, for example user set U and category set L, their associations represented by the matrix $D_r$ and the cluster cohesiveness threshold $T_c$ (an example of the pre-determined threshold of FIGS. 2A-2B) that drives the co-clustering process. The function then returns k co-clusters of users and categories stored in the co-cluster set $C^{(u,l)} = \{c_1^{(u,l)}, c^{(u,l)}, \ldots, c_k^{(u,l)}\}$. Each $c_i^{(u,l)} \in C^{(u,l)}$ is next processed independently from the other k−1 co-clusters. More precisely, for each $c_j^{(u,l)}$, content-aware co-clustering algorithm based on hourglass model expands each category l in $c_j^{(u,l)}$ by bringing back all the raw webpages that were aggregated to the same category. As a result, the user-category $c_j^{(u,l)}$ is transformed to a new user-webpage co-cluster $c_j^{(u,\tilde{w})}$. The corresponding associations of the new co-cluster is then captured by a new matrix called $D_e(j)$ that is next processed by the function KERNELPHANTOM. Although this phase may have greatly expanded the number of columns of $D_e$ when comparing it with the matrix $D_r$, the number of rows and columns of $D_e$ refer to only users and webpages belonging only to the same cluster, and thus its size is typically much smaller when compared to the size of the original matrix D. Next, the KERNELPHANTOM function processed independently each co-cluster by receiving as inputs the set of users and webpages constituting the co-cluster, i.e., $c_j^{(u)}$ and $c_j^{(\tilde{w})}$, the associated matrix $D_r(j)$ and the cluster cohesiveness threshold $T_c$ and returns new set of $\theta(j)$ co-clusters $C^{(u,w)}(j) = \{c_1^{(u,w)}, \ldots, c_{\theta_j}^{(u,w)}\}(j)$. After processing each cluster $c_j^{(\tilde{w})}$ with i=1, ..., k, content-aware co-clustering algorithm based on hourglass model appends all the clusters into the set Δ whose cardinality is represented by θ. This ends the procedure.

Next, we describe the inner function KERNELPHANTOM (being called at lines 6 and 12 in TABLE 1) in TABLE 3 below.

TABLE 3

FUNCTION: KERNELPHANTOM(A, B, F, T)

```
1:   /* Initialization */
2:   r ← 1;
3:   c^(a,b) (r) ← {A, B};
4:   F_r = D;
5:   S ← [c^(a,b)(r)];
6:   s ← 1;
7:   L ← { };
8:   l ← 0
9:   stop ← false;
10:  /* Soft Co-Clustering */
11:  while stop == false do
12:    c^(a,b) (r) ← S[r];
13:    F_r = ExtractMatrix(F, c^(a,b) (r));
14:    {c_1^(a,b) (r), c_2^(a,b) (r)} = SpectralGraphBiPart(F_r, c^(a,b) (r),2);
```

TABLE 3-continued

FUNCTION: KERNELPHANTOM(A, B, F, T)

```
15:    Γ^(a,b)(r)=ComputeCohesion(F_r, c^(a,b)(r), c_1^(a,b)(r), c_2^(a,b)(r));
16:    if (γ_1^(a,b) < T)&&(γ_2^(a,b) < T) then
17:      L ← L∪{c^(a,b)(r)};
18:      l + +;
19:    else if (|c_1^(b)(r)| == 0)||(c_2^(b)(r)| == 0) then
20:      L ← L∪ {c^(a,b)(r)};
21:      l + +;
22:    else if (|c_1^(a)(r)| == 0)||(|c_2^(a)(r) == 0) then
23:      L ← L∪ {c^(a,b)(r)};
24:      l + +;
25:    else
26:      for j=1 to 2 do
27:        if γ_j^(a,b)(r) < T then
28:          (c_j^(a,b)(r))=BorrowColumns(c_j^(a,b)(r), c^(a,b)(r), T);
29:      for j=1 to 2 do
30:        if |c_j^(a)(r)| == 1 or |c_j^(b)(r)| == 1 then
31:          L ← L∪{c_j^(a,b)(r)};
32:          l + +;
33:        else
34:          S ← S.add(c_j^(a,b)(r));
35:          s + +;
36:  return (L,l);
```

The function of the KERNELPHANTOM is to find all the co-clusters that are sufficiently cohesive and are the leaves in the binary tree formed by the PHANTOM algorithm. The function receives as an input the set of entities to be clustered together, i.e., A and B, their associations captured in the data matrix F and the cluster cohesiveness threshold T. In particular, KERNELPHANTOM does not require the user to specify the number of co-clusters to be used. The KERNELPHANTOM partitions the data recursively in a divisive way using a binary tree. Indeed, at each iteration the parent node is always partitioned into two distinct children nodes. Children nodes become parent nodes in the next iteration and the process continues until a stopping criterion is met. Since the PHANTOM enables soft co-clustering, each children can borrow entities from his sibling nodes if required.

TABLE 3 shows the pseudo-code of KERNELPHANTOM. It starts with an initialization phase (lines 2 to 9), where the index that tracks the partition (or parent node) that will be processed r is set to 1, the partition itself is initialized to the entire data-set, i.e., $c^{(a,b)}(r) \leftarrow \{A,B\}$. The array that tracks all executed partitions S is set to $c_r^{(a,b)}$ and its cardinality s is set to 1. The matrix $F_r$ that captures the associations among the entities belonging to the co-cluster $c_r^{(a,b)}$ is extracted from the original matrix F by considering only the rows and columns corresponding to the co-cluster $c_r^{(a,b)}$ and $F_r$ is initialized to the entire matrix F. Finally, the set of leaves (or children) found, i.e., the set L for containing the co-clusters to be found, is set to the empty set and its cardinality set to 0. Furthermore, the function uses a boolean flag "stop" that is used to close a specific branch of the binary tree according to some stopping criterion. At each iteration r, lines 12 and 13 extract from the set S the current partition to be analyzed, generate the corresponding matrix $F_r$ while line 14 calls a SpectralGraphBipart function that receives as an input the parent node $c_r^{(a,b)}$, the matrix $F_r$ and the number in which the set has to be partitioned, i.e., 2 in the example implementation, and outputs the two children nodes $c_1^{(a,b)}(r)$, $c_2^{(a,b)}(r)$. Line 15 computes the cluster cohesion of the two children nodes according to Equation (8). Lines 16 through 35 of the algorithm determines if a particular children node should be partitioned further or declared as a leaf node. If the cohesion (i.e., cohesiveness metric) of both the children nodes is less than T, then we conclude that the parent node is a leaf cluster and thus cannot be partitioned further. The set of leaf nodes L is updated by including the parent node and its cardinality is increased (Line 16 to 18). In addition, if any of the children nodes have either $c_i^{(a)}(r)$ or $c_i^{(b)}(r)$ with cardinality zero (i.e., cardinality of any of $c_1^{(a)}(r)$, $c_1^{(b)}(r)$, $c_2^{(a)}(r)$, or $c_2^{(b)}(r)$ being 0), then we conclude that the parent node is a leaf cluster. If the cluster cohesion of both the children nodes is greater than T, then both the children nodes are added to the list of clusters that will be partitioned in subsequent iterations. However if the cohesion of only one of children nodes is greater than T, then we use the following rule.

For the cluster whose cohesion is less than T, we borrow entities from the set $c_i^{(b)}(r)$ of the sibling cluster until the cohesion of the cluster is above the threshold value (Lines 27-28). In doing so, for each category belonging to the sibling node we compute the total sum of weights of links attached to the user set of the borrowing cluster. We sort these categories in decreasing order, from the category contributing the most to the category contributing the least. We add one category at the time, starting from the first in the list and compute the cluster cohesiveness metric of the new cluster being formed. We keep iterating these steps until the cluster cohesiveness metric is greater than T.

Finally, we declare that any resulting children node with either $|c_i^{(a)}(r)|=1$ or $|c_i^{(b)}(r)|=1$ to be a leaf cluster and hence is not partitioned further (Lines 30-32). The above steps are repeated until we are left with only leaf clusters that cannot be partitioned further and the set of leaf nodes L and associated cardinality 1 is returned (Line 36).

The PHANTOM algorithm described above is applied to an example to profile 20 users who visit 16 different websites with the data matrix D represents the frequency of their visits to the website. For easy of illustration, non-normalized matrix format is shown in the description below, however D, $D_r$ and $D_e$ may be raw-side normalized (i.e., every single raw in these matrices sum to 1) in actual execution of PHANTOM.

TABLE 5

Matrix Dr with size 16 * 5

| WEATHER | SOCIAL NETWORKS | MAIL | E-COMMERCE | DATING |
|---|---|---|---|---|
| 146 | 0 | 0 | 0 | 0 |
| 99 | 0 | 0 | 0 | 0 |
| 171 | 0 | 0 | 0 | 0 |
| 175 | 0 | 0 | 0 | 0 |
| 0 | 37 | 55 | 0 | 0 |
| 0 | 27 | 41 | 0 | 0 |
| 0 | 28 | 42 | 0 | 0 |
| 0 | 22 | 34 | 0 | 0 |
| 0 | 21 | 31 | 0 | 0 |
| 0 | 30 | 45 | 0 | 0 |
| 0 | 0 | 0 | 61 | 0 |
| 0 | 0 | 0 | 187 | 0 |
| 0 | 0 | 0 | 99 | 0 |
| 0 | 0 | 0 | 134 | 0 |
| 23 | 0 | 0 | 15 | 0 |
| 54 | 0 | 0 | 36 | 0 |
| 23 | 0 | 0 | 16 | 0 |
| 49 | 0 | 0 | 33 | 0 |
| 0 | 0 | 35 | 35 | 47 |
| 0 | 0 | 49 | 49 | 65 |

We start the example by showing in Table 4 the input matrix D with 20 users (user 1 through user 20 represented in ascending order as the matrix rows) and 16 websites (represented as the matrix columns denoted A through Q). During the dimension reduction stage of PHANTOM, we map (or aggregate) these 16 websites into high level categories. The 16 websites (A through Q) and the 5 high level categories (WEATHER, SOCIAL-NETWORKING, MAIL, E-COMMERCE, and DATING) are shown in Table 2. The heuristics used to generate these representative entities (i.e., the 5 high level categories) do not introduce any distortion on the input data as semantically similar webpages are mapped to the same category. As shown in TABLE 5 the dimensionality of the origi-

TABLE 4

Matrix D with size 20*16

| A | B | C | D | E | F | G | H | I | J | K | L | M | N | P | Q |
|---|---|---|---|---|---|---|---|---|---|---|---|---|---|---|---|
| 44 | 59 | 0 | 0 | 44 | 0 | 0 | 0 | 0 | 0 | 0 | 0 | 0 | 0 | 0 | 0 |
| 0 | 0 | 100 | 0 | 0 | 0 | 0 | 0 | 0 | 0 | 0 | 0 | 0 | 0 | 0 | 0 |
| 51 | 68 | 0 | 0 | 51 | 0 | 0 | 0 | 0 | 0 | 0 | 0 | 0 | 0 | 0 | 0 |
| 0 | 0 | 0 | 124 | 0 | 0 | 0 | 0 | 0 | 0 | 0 | 0 | 0 | 0 | 0 | 0 |
| 0 | 0 | 0 | 0 | 0 | 15 | 4 | 19 | 28 | 17 | 6 | 6 | 0 | 0 | 0 | 0 |
| 0 | 0 | 0 | 0 | 0 | 11 | 3 | 14 | 21 | 12 | 4 | 4 | 0 | 0 | 0 | 0 |
| 0 | 0 | 0 | 0 | 0 | 11 | 3 | 14 | 21 | 13 | 4 | 4 | 0 | 0 | 0 | 0 |
| 0 | 0 | 0 | 0 | 0 | 9 | 2 | 11 | 17 | 10 | 3 | 3 | 0 | 0 | 0 | 0 |
| 0 | 0 | 0 | 0 | 0 | 8 | 2 | 11 | 16 | 9 | 3 | 3 | 0 | 0 | 0 | 0 |
| 0 | 0 | 0 | 0 | 0 | 12 | 3 | 15 | 23 | 14 | 5 | 5 | 0 | 0 | 0 | 0 |
| 0 | 0 | 0 | 0 | 0 | 0 | 0 | 0 | 0 | 0 | 0 | 0 | 49 | 12 | 0 | 0 |
| 0 | 0 | 0 | 0 | 0 | 0 | 0 | 0 | 0 | 0 | 0 | 0 | 150 | 37 | 0 | 0 |
| 0 | 0 | 0 | 0 | 0 | 0 | 0 | 0 | 0 | 0 | 0 | 0 | 79 | 20 | 0 | 0 |
| 0 | 0 | 0 | 0 | 0 | 0 | 0 | 0 | 0 | 0 | 0 | 0 | 107 | 27 | 0 | 0 |
| 7 | 5 | 2 | 2 | 7 | 0 | 0 | 0 | 0 | 0 | 0 | 0 | 12 | 3 | 0 | 0 |
| 16 | 11 | 5 | 5 | 16 | 0 | 0 | 0 | 0 | 0 | 0 | 0 | 29 | 7 | 0 | 0 |
| 7 | 9 | 0 | 0 | 7 | 0 | 0 | 0 | 0 | 0 | 0 | 0 | 16 | 0 | 0 | 0 |
| 15 | 10 | 0 | 0 | 25 | 0 | 0 | 0 | 0 | 0 | 0 | 0 | 0 | 33 | 0 | 0 |
| 0 | 0 | 0 | 0 | 0 | 0 | 0 | 18 | 11 | 4 | 4 | 28 | 7 | 19 | 28 | |
| 0 | 0 | 0 | 0 | 0 | 0 | 0 | 25 | 15 | 5 | 5 | 39 | 10 | 26 | 39 | | nal matrix D of size 20*16 is reduced to the matrix $D_r$ of size 20*5 obtained after the column-wise aggregation. Although in such a simple example the reduction obtained with aggregation in representative categories is limited, in more realistic scenarios this step can substantially reduce the number of columns. For example, when processing 1-hour of HTTP traffic collected from a Wireless 3G Operator in North America, during which up to 850,000 distinct webpages being browsed by a population of distinct 1,000,000+ users per hour, columns of data matrix D are aggregated using l=15 categories based on the keyword mapping specified in Table 6 to cover the entire webpage space resulting a reduction factor of more than 65,000.

TABLE 6

| Category | Keywords | Category | Keywords |
|---|---|---|---|
| Dating | dating, harmony, personals, single, chemistry, match | | |
| Music[1] | song, mp3, audio, music, track, pandora | | |
| News | magazine, tribune, news, journal, times | | |
| Trading | amazon, ebay, buy, market, craigslist | | |
| Social netw. | facebook, myspace, twitter, blog | | |
| Gaming | poker, blackjack, game, casino | Mail | mail |
| Maps | virtualearth, maps | MMS | mms |
| Photo | gallery, picture, photo, flickr | Ringtones | tones |
| Search | google, yahoo, msn | Weather | weather |
| Travel | vacation, hotel, expedia, travel | Video | video |

Figure 3A:
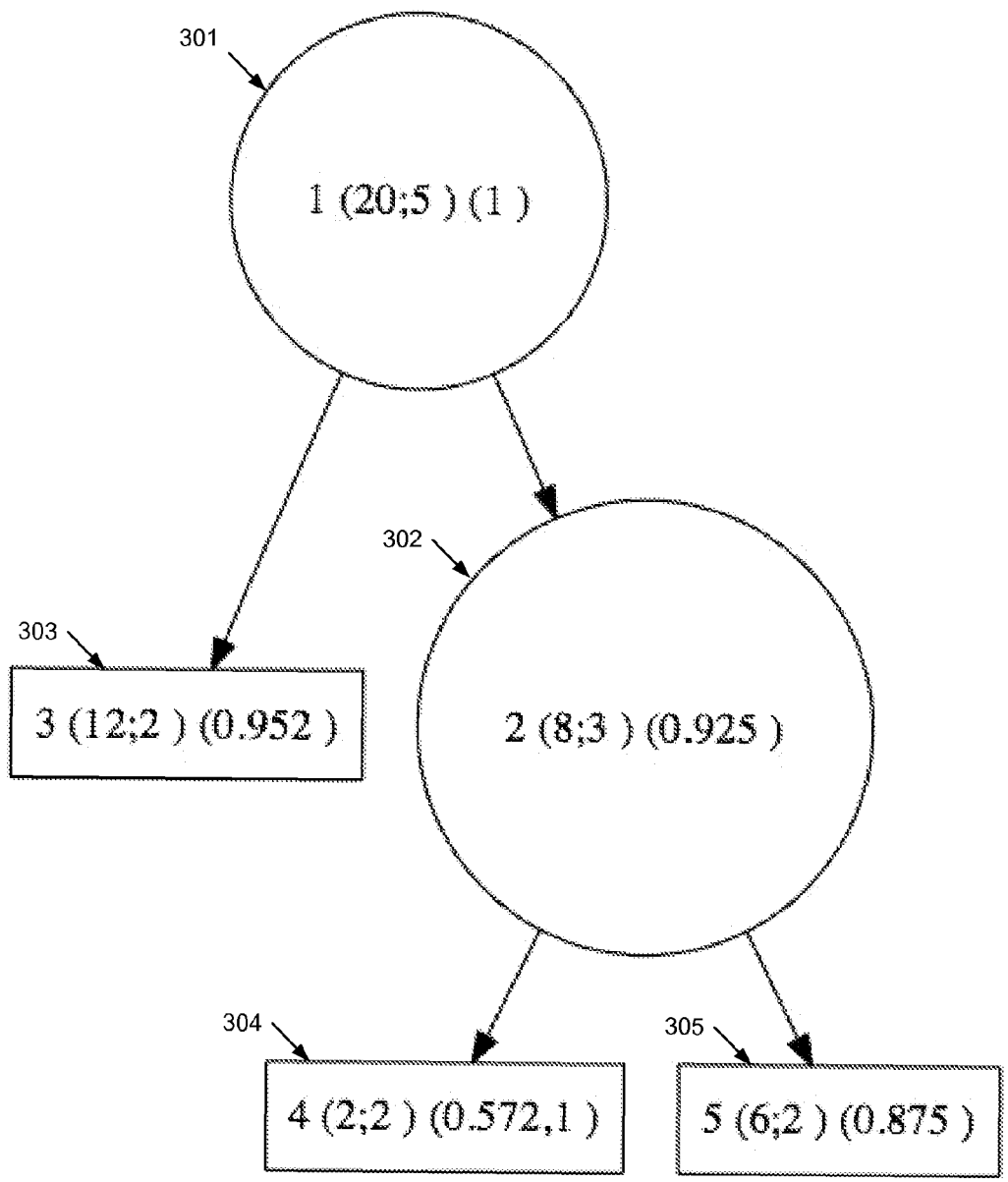
FIGS. 3A-3D show an example according to aspects of the invention.

The matrix $D_r$ shown in Table 5 is then normalized and fed to the KERNELPHANOM function. When using a cohesiveness threshold $T_c$ of 0.8, the KERNELPHANOM function produces a data partitioning of the space (users,categories) in the form of a hierarchical tree of clusters as shown in FIG. 3A.

Figure 3B:
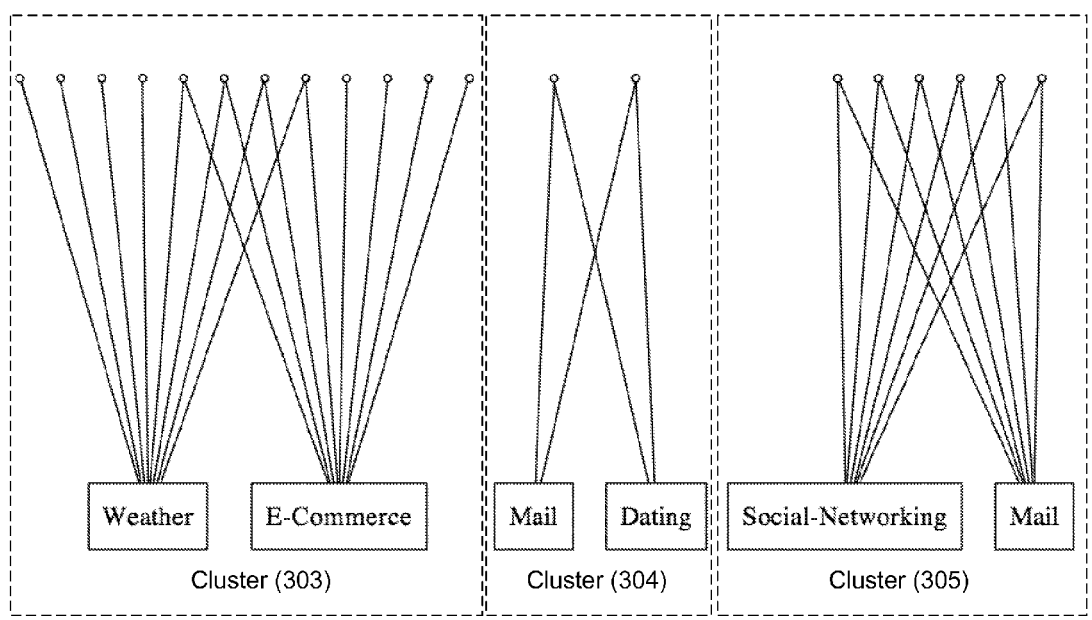

At the first level, the KERNELPHANOM function aggregates the entire (user,category) space into a single node (301) and at the first iteration it forces the node to split into two children clusters (302, 303). For each children node it computes the cluster cohesiveness metric as 0.952 for cluster (303) and 0.925 for cluster (302) both exceeding the threshold $T_c$ of 0.8. In the second iteration, each children node becomes a parent node and the algorithm, as before, forces each parent to be split into two children nodes. When processing the cluster (303) as a parent node, each of the children has a cluster cohesiveness metric less than T of 0.8. Thus the cluster (303) is determined to be a leaf node of the hierarchical tree and the corresponding branch is closed (i.e., no further processing will be executed on the node). When the KERNELPHANOM function does the same for the cluster (302), it finds two children nodes (304, 305) with cluster cohesiveness value of 0.572 for cluster (304) and 0.875 for cluster (305). Note that while the cluster (305) is eligible for a further split, cluster (304) does not meet the cohesiveness criteria. At this point, the KERNELPHANOM function allows cluster (304) to borrow categories from its sibling node (305). By borrowing just one category (i.e., MAIL), the cluster (304) achieves a cohesiveness value of 1 to exceed the threshold $T_c$ of 0.8. Accordingly, both clusters (304, 305) are forced to split into two children at the next iteration. However, all four children obtained does not meet the cohesiveness criteria. Thus, the KERNELPHANOM function determines clusters (303, 304, 305) as leaf nodes and the process ends. The detailed composition of the three leaf clusters is shown in FIG. 3B where the small circles denote users (1-20) and the rectangles denote the 5 representative entities. Specifically, users (1-4, 11-18) and categories (WEATHER, E-COMMERCE) are included in cluster (303) with the users (15-18) being associated with both WEATHER and E-COMMERCE categories, users (19, 20) and categories (MAIL and DATING) are included in cluster (304), as well as users (5-10) and categories (SOCIAL-NETWORKING and MAIL) are included in cluster (305).

At this point PHANTOM takes each of the clusters (303, 304, 305) obtained by the KERNELPHANTOM function and expands them by constructing a matrix $D_e$ for each of such clusters (303, 304, 305). Table 7 shows an example matrix $D_e$ of cluster (303) having 12 rows representing users (1-4, 11-18) and 7 columns representing websites (A-E, M, N) that correspond to two categories (WEATHER, E-COMMERCE) based on the mapping specified in Table 2. These users (1-4, 11-18) and websites (A-E, M, N) may be viewed as an example of the intermediate co-cluster of FIGS. 1 and 2A-2B.

TABLE 7

| A | B | C | D | E | M | N |
|---|---|---|---|---|---|---|
| 44 | 59 | 0 | 0 | 44 | 0 | 0 |
| 0 | 0 | 100 | 0 | 0 | 0 | 0 |
| 51 | 68 | 0 | 0 | 51 | 0 | 0 |
| 0 | 0 | 0 | 124 | 0 | 0 | 0 |
| 0 | 0 | 0 | 0 | 0 | 0 | 61 |
| 0 | 0 | 0 | 0 | 0 | 0 | 187 |
| 0 | 0 | 0 | 0 | 0 | 99 | 0 |
| 0 | 0 | 0 | 0 | 0 | 107 | 27 |
| 0 | 0 | 0 | 23 | 0 | 12 | 3 |
| 0 | 0 | 0 | 53 | 0 | 29 | 7 |
| 7 | 9 | 0 | 0 | 7 | 16 | 0 |
| 15 | 10 | 0 | 0 | 25 | 0 | 33 |

Figure 3C:
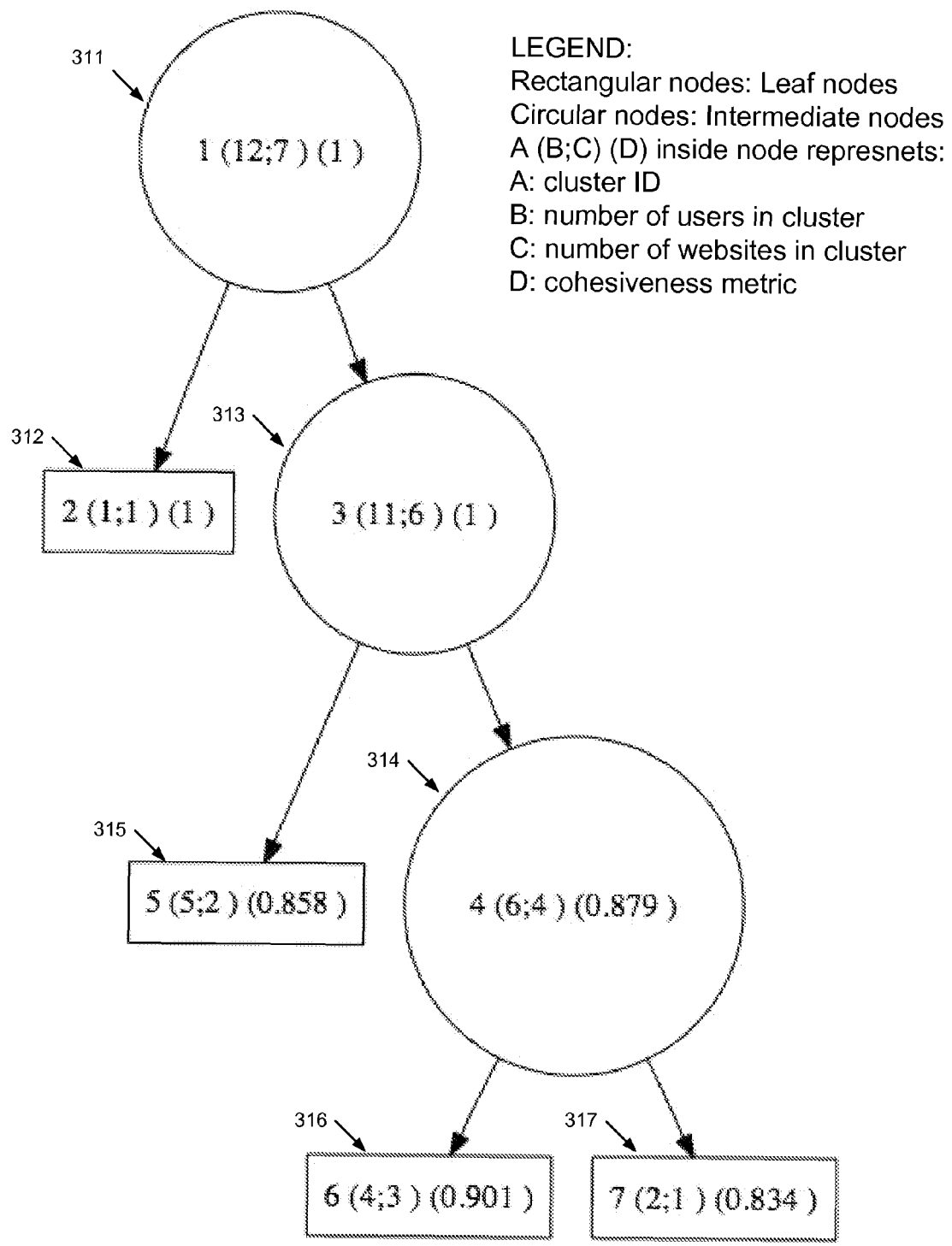
Figure 3D:
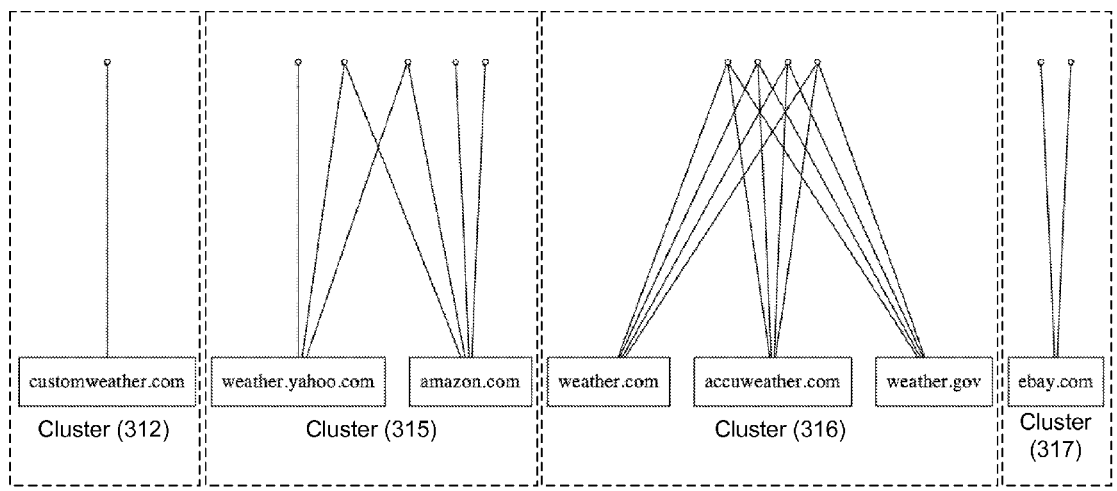

Each matrix $D_e$ of the clusters (303, 304, 305) in FIG. 3A is processed again by the KERNELPHANTOM function to partition the (user,webpage) sub-space associated with each of the clusters (303, 304, 305) (viewed as examples of the intermediate co-clusters of FIGS. 1 and 2A-2B) in search for users with similar browsing activity. For example, the KERNELPHANTOM function partitions the cluster (303) into the binary tree (viewed as an example of the hierarchical tree associated with the expanded intermediate co-cluster of FIGS. 1 and 2A-2B) as shown in FIG. 3C where the cluster (311) is associated with the matrix $D_e$ for cluster (303) of FIG. 3A. The compositions of each of the leaf nodes (312, 315, 316, 317) (viewed as examples of the final co-clusters of FIGS. 1 and 2A-2B) in FIG. 3C are shown in detail in FIG. 3D. In FIG. 3D, the small circles denote users (1-20) and the rectangles denote 7 webpages of the original webpages (A through Q) described in Table 4 above.

Although specific formats or structures are used as examples in the foregoing description regarding the association matrix, the reduced matrix, the intermediate co-cluster, the expanded intermediate co-cluster, the mapping table, the final co-cluster, etc., one skilled in the art, with the benefit of this disclosure, will recognize that other formats or structures may also be used in the system, methods, and examples described without deviating from the spirit of the invention.

Figure 4:
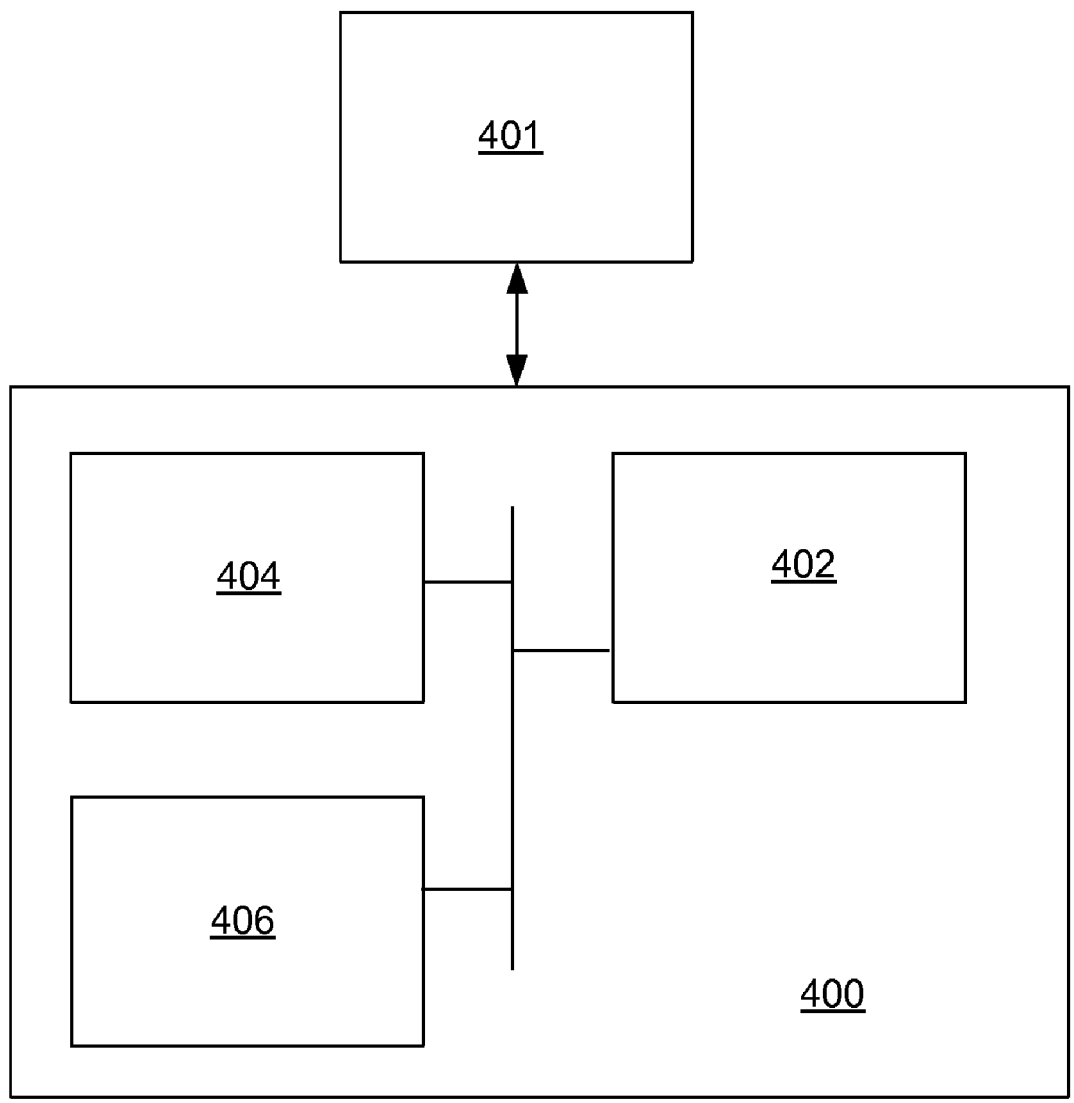
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a network operation, comprising:
    obtaining an association matrix having a plurality of columns corresponding to a plurality of first entities in the network and a plurality of rows corresponding to a plurality of second entities in the network, wherein an element of the association matrix in a column corresponding to a first entity of the plurality of the first entities and in a row corresponding to a second entity of the plurality of the second entities represents an association parameter between the first entity and the second entity;
    generating a reduced matrix of the association matrix by aggregating the plurality of columns based on a pre-determined mapping from the plurality of the first entities into a plurality of representative entities, wherein an element of the reduced matrix in a column corresponding to a first representative entity of the plurality of the representative entities and in the row corresponding to the second entity of the plurality of the second entities represents an association parameter between the first representative entity and the second entity;
    partitioning, using a processor of a computer, a set comprising the plurality of representative entities and the plurality of second entities into a plurality of intermediate co-clusters based on a first cohesiveness criterion associated with the reduced matrix; wherein an intermediate co-cluster of the plurality of intermediate co-clusters comprises one or more representative entities of the plurality of representative entities and one or more second entities of the plurality of the second entities;
    mapping the one or more representative entities to corresponding first entities within the plurality of first entities based on a reversal of the pre-determined mapping to generate an expanded intermediate co-cluster from the intermediate co-cluster; wherein the expanded intermediate co-cluster comprises the corresponding first entities and the one or more second entities;
    partitioning, using the processor of the computer, the expanded intermediate co-cluster into a plurality of final co-clusters based on a second cohesiveness criterion associated with the association matrix;
    generating a profile of network activities based on the plurality of final co-clusters; and
    performing the network operation based on the profile of the network activities.

2. The method of claim 1, wherein the partitioning the set comprises:
    forming a hierarchical tree of co-clusters associated with the reduced-matrix based on the set comprising the plurality of representative entities and the plurality of second entities;
    recursively partitioning a leaf co-cluster of the hierarchical tree to expand the hierarchical tree, using the processor of the computer, when a first cohesiveness metric, associated with the reduced matrix, of a children co-cluster generated by partitioning the leaf co-cluster exceeds a pre-determined threshold, wherein the children co-cluster is attached to the leaf co-cluster in the hierarchical tree thus turning the leaf co-cluster into a parent of the children co-cluster and turning the children co-cluster into another leaf co-cluster;
    when the first cohesiveness metric of the children co-cluster exceeds the pre-determined threshold and the first cohesiveness metric of another children co-cluster generated by partitioning the leaf co-cluster is less than the pre-determined threshold, borrowing a representative entity from the children co-cluster to add to the another children co-cluster, and
    when the first cohesiveness metric of each of all children co-clusters generated by partitioning the leaf co-cluster is less than the pre-determined threshold, assigning the leaf co-cluster as one of the plurality of intermediate co-clusters.

3. The method of claim 2,
    wherein each partitioning step of the recursively partitioning step generates two children co-clusters; and
    wherein the leaf co-cluster is partitioned only when the leaf co-cluster comprises at least two representative entities and at least two second entities.

4. The method of claim 2,
    wherein the leaf co-cluster comprises a portion of the plurality of representative entities and a portion of the plurality of second entities,
    wherein the children co-cluster comprises a subset of the portion of the plurality of representative entities and a subset of the portion of the plurality of second entities,
    wherein the first cohesiveness metric of the children co-cluster is defined as a ratio of a sum of weights of (representative entity, second entity) pairs within the children co-cluster to a sum of weights of (representative entity, second entity) pairs within the leaf co-cluster that originates from the children co-cluster, and wherein each of the weights is determined from a corresponding element in the reduced matrix.

5. The method of claim 1, wherein the partitioning the expanded intermediate co-cluster comprises:
forming a hierarchical tree of co-clusters associated with the expanded intermediate co-cluster based on the corresponding first entities and the one or more second entities;
recursively partitioning a leaf co-cluster of the hierarchical tree to expand the hierarchical tree, using the processor of the computer, when a second cohesiveness metric, associated with the association-matrix, of a children co-cluster generated by partitioning the leaf co-cluster exceeds a pre-determined threshold, wherein the children co-cluster is attached to the leaf co-cluster in the hierarchical tree thus turning the leaf co-cluster into a parent of the children co-cluster and turning the children co-cluster into another leaf co-cluster;
when the second cohesiveness metric of the children co-cluster exceeds the pre-determined threshold and the second cohesiveness metric of another children co-cluster generated by partitioning the leaf co-cluster is less than the pre-determined threshold, borrowing a first entity from the children co-cluster to add to the another children co-cluster; and
when the second cohesiveness metric of each of all children co-clusters generated by partitioning the leaf co-cluster is less than the pre-determined threshold, assigning the leaf co-cluster as one of the plurality of final co-clusters.

6. The method of claim 5,
wherein each partitioning step of the recursively partitioning step generates two children co-clusters; and
wherein the leaf co-cluster is partitioned only when the leaf co-cluster comprises at least two first entities and at least two second entities.

7. The method of claim 5,
wherein the leaf co-cluster comprises a portion of the plurality of first entities and a portion of the plurality of second entities,
wherein the children co-cluster comprises a subset of the portion of the plurality of first entities and a subset of the portion of the plurality of second entities,
wherein the second cohesiveness metric of the children co-cluster is defined as a ratio of a sum of weights of (first entity, second entity) pairs within the children co-cluster to a sum of weights of (first entity, second entity) pairs within the leaf co-cluster that originates from the children co-cluster, and
wherein each of the weights is determined from a corresponding element in the association matrix.

8. The method of claim 1, wherein a (first entity, second entity) pair of the association matrix comprises at least one of (browsed website, browsing user), (account metric, account user), (word, document containing word), (VoIP speech metric, speaker), and (image feature, image containing image feature).

9. A non-transitory computer readable medium, embodying instructions when executed by the computer to perform a network operation, the instructions comprising functionality for:
obtaining an association matrix having a plurality of columns corresponding to a plurality of first entities in the network and a plurality of rows corresponding to a plurality of second entities in the network, wherein an element of the association matrix in a column corresponding to a first entity of the plurality of the first entities and in a row corresponding to a second entity of the plurality of the second entities represents an association parameter between the first entity and the second entity;
generating a reduced matrix of the association matrix by aggregating the plurality of columns based on a pre-determined mapping from the plurality of the first entities into a plurality of representative entities, wherein an element of the reduced matrix in a column corresponding to a first representative entity of the plurality of the representative entities and in the row corresponding to the second entity of the plurality of the second entities represents an association parameter between the first representative entity and the second entity;
partitioning, using a processor of a computer, a set comprising the plurality of representative entities and the plurality of second entities into a plurality of intermediate co-clusters based on a first cohesiveness criterion associated with the reduced matrix; wherein an intermediate co-cluster of the plurality of intermediate co-clusters comprises one or more representative entities of the plurality of representative entities and one or more second entities of the plurality of the second entities;
mapping the one or more representative entities to corresponding first entities within the plurality of first entities based on a reversal of the pre-determined mapping to generate an expanded intermediate co-cluster from the intermediate co-cluster; wherein the expanded intermediate co-cluster comprises the corresponding first entities and the one or more second entities;
partitioning, using the processor of the computer, the expanded intermediate co-cluster into a plurality of final co-clusters based on a second cohesiveness criterion associated with the association matrix;
generating a profile of network activities based on the plurality of final co-clusters; and
performing the network operation based on the profile of the network activities.

10. The non-transitory computer readable medium of claim 9, wherein the partitioning the set comprises:
forming a hierarchical tree of co-clusters associated with the reduced-matrix based on the set comprising the plurality of representative entities and the plurality of second entities;
recursively partitioning a leaf co-cluster of the hierarchical tree to expand the hierarchical tree, using the processor of the computer, when a first cohesiveness metric, associated with the reduced matrix, of a children co-cluster generated by partitioning the leaf co-cluster exceeds a pre-determined threshold, wherein the children co-cluster is attached to the leaf co-cluster in the hierarchical tree thus turning the leaf co-cluster into a parent of the children co-cluster and turning the children co-cluster into another leaf co-cluster;
when the first cohesiveness metric of the children co-cluster exceeds the pre-determined threshold and a reduced-matrix based cohesiveness metric of another children co-cluster generated by partitioning the leaf co-cluster is less than the pre-determined threshold, borrowing a representative entity from the children co-cluster to add to the another children co-cluster, and
when the first cohesiveness metric of each of all children co-clusters generated by partitioning the leaf co-cluster is less than the pre-determined threshold, assigning the leaf co-cluster as one of the plurality of intermediate co-clusters.

11. The non-transitory computer readable medium of claim 10,
wherein each partitioning step of the recursively partitioning step generates two children co-clusters; and
wherein the leaf co-cluster is partitioned only when the leaf co-cluster comprises at least two representative entities and at least two second entities.

12. The non-transitory computer readable medium of claim 10,
wherein the leaf co-cluster comprises a portion of the plurality of representative entities and a portion of the plurality of second entities,
wherein the children co-cluster comprises a subset of the portion of the plurality of representative entities and a subset of the portion of the plurality of second entities,
wherein the first cohesiveness metric of the children co-cluster is defined as a ratio of a sum of weights of (representative entity, second entity) pairs within the children co-cluster to a sum of weights of (representative entity, second entity) pairs within the leaf co-cluster that originates from the children co-cluster, and
wherein each of the weights is determined from a corresponding element in the reduced matrix.

13. The non-transitory computer readable medium of claim 9, wherein the partitioning the expanded intermediate co-cluster comprises:
forming a hierarchical tree of co-clusters associated with the expanded intermediate co-cluster based on the corresponding first entities and the one or more second entities;
recursively partitioning a leaf co-cluster of the hierarchical tree to expand the hierarchical tree, using the processor of the computer, when a second cohesiveness metric, associated with the association-matrix, of a children co-cluster generated by partitioning the leaf co-cluster exceeds a pre-determined threshold, wherein the children co-cluster is attached to the leaf co-cluster in the hierarchical tree thus turning the leaf co-cluster into a parent of the children co-cluster and turning the children co-cluster into another leaf co-cluster;
when the second cohesiveness metric of the children co-cluster exceeds the pre-determined threshold and the second cohesiveness metric of another children co-cluster generated by partitioning the leaf co-cluster is less than the pre-determined threshold, borrowing a first entity from the children co-cluster to add to the another children co-cluster; and
when the second cohesiveness metric of each of all children co-clusters generated by partitioning the leaf co-cluster is less than the pre-determined threshold, assigning the leaf co-cluster as one of the plurality of final co-clusters.

14. The non-transitory computer readable medium of claim 13,
wherein each partitioning step of the recursively partitioning step generates two children co-clusters; and
wherein the leaf co-cluster is partitioned only when the leaf co-cluster comprises at least two first entities and at least two second entities.

15. The non-transitory computer readable medium of claim 13,
wherein the leaf co-cluster comprises a portion of the plurality of first entities and a portion of the plurality of second entities,
wherein the children co-cluster comprises a subset of the portion of the plurality of first entities and a subset of the portion of the plurality of second entities,
wherein the second cohesiveness metric of the children co-cluster is defined as a ratio of a sum of weights of (first entity, second entity) pairs within the children co-cluster to a sum of weights of (first entity, second entity) pairs within the leaf co-cluster that originates from the children co-cluster, and
wherein each of the weights is determined from a corresponding element in the association matrix.

16. The non-transitory computer readable medium of claim 9, wherein a (first entity, second entity) pair of the association matrix comprises at least one of (browsed website, browsing user), (account metric, account user), (word, document containing word), (VoIP speech metric, speaker), and (image feature, image containing image feature).

17. A system for performing a network operation, comprising:
a processor; and
memory storing instructions when executed by the processor comprising functionalities for:
obtaining an association matrix having a plurality of columns corresponding to a plurality of first entities in the network and a plurality of rows corresponding to a plurality of second entities in the network, wherein an element of the association matrix in a column corresponding to a first entity of the plurality of the first entities and in a row corresponding to a second entity of the plurality of the second entities represents an association parameter between the first entity and the second entity;
generating a reduced matrix of the association matrix by aggregating the plurality of columns based on a pre-determined mapping from the plurality of the first entities into a plurality of representative entities, wherein an element of the reduced matrix in a column corresponding to a first representative entity of the plurality of the representative entities and in the row corresponding to the second entity of the plurality of the second entities represents an association parameter between the first representative entity and the second entity;
partitioning, using a processor of a computer, a set comprising the plurality of representative entities and the plurality of second entities into a plurality of intermediate co-clusters based on a first cohesiveness criterion associated with the reduced matrix; wherein an intermediate co-cluster of the plurality of intermediate co-clusters comprises one or more representative entities of the plurality of representative entities and one or more second entities of the plurality of the second entities;
mapping the one or more representative entities to corresponding first entities within the plurality of first entities based on a reversal of the pre-determined mapping to generate an expanded intermediate co-cluster from the intermediate co-cluster; wherein the expanded intermediate co-cluster comprises the corresponding first entities and the one or more second entities;
partitioning, using the processor of the computer, the expanded intermediate co-cluster into a plurality of final co-clusters based on a second cohesiveness criterion associated with the association matrix;
generating a profile of network activities based on the plurality of final co-clusters; and
performing the network operation based on the profile of the network activities.

18. The system of claim 17, wherein the partitioning the set comprises:

forming a hierarchical tree of co-clusters associated with the reduced-matrix based on the set comprising the plurality of representative entities and the plurality of second entities;

recursively partitioning a leaf co-cluster of the hierarchical tree to expand the hierarchical tree, using the processor of the computer, when a first cohesiveness metric, associated with the reduced matrix, of a children co-cluster generated by partitioning the leaf co-cluster exceeds a pre-determined threshold, wherein the children co-cluster is attached to the leaf co-cluster in the hierarchical tree thus turning the leaf co-cluster into a parent of the children co-cluster and turning the children co-cluster into another leaf co-cluster;

when the first cohesiveness metric of the children co-cluster exceeds the pre-determined threshold and a reduced-matrix based cohesiveness metric of another children co-cluster generated by partitioning the leaf co-cluster is less than the pre-determined threshold, borrowing a representative entity from the children co-cluster to add to the another children co-cluster, and when the first cohesiveness metric of each of all children co-clusters generated by partitioning the leaf co-cluster is less than the pre-determined threshold, assigning the leaf co-cluster as one of the plurality of intermediate co-clusters.

19. The system of claim 18, wherein each partitioning step of the recursively partitioning step generates two children co-clusters; and wherein the leaf co-cluster is partitioned only when the leaf co-cluster comprises at least two representative entities and at least two second entities.

20. The system of claim 18, wherein the leaf co-cluster comprises a portion of the plurality of representative entities and a portion of the plurality of second entities, wherein the children co-cluster comprises a subset of the portion of the plurality of representative entities and a subset of the portion of the plurality of second entities, wherein the first cohesiveness metric of the children co-cluster is defined as a ratio of a sum of weights of (representative entity, second entity) pairs within the children co-cluster to a sum of weights of (representative entity, second entity) pairs within the leaf co-cluster that originates from the children co-cluster, and wherein each of the weights is determined from a corresponding element in the reduced matrix.

21. The system of claim 17, wherein the partitioning the expanded intermediate co-cluster comprises:

forming a hierarchical tree of co-clusters associated with the expanded intermediate co-cluster based on the corresponding first entities and the one or more second entities;

recursively partitioning a leaf co-cluster of the hierarchical tree to expand the hierarchical tree, using the processor of the computer, when a second cohesiveness metric, associated with the association-matrix, of a children co-cluster generated by partitioning the leaf co-cluster exceeds a pre-determined threshold, wherein the children co-cluster is attached to the leaf co-cluster in the hierarchical tree thus turning the leaf co-cluster into a parent of the children co-cluster and turning the children co-cluster into another leaf co-cluster;

when the second cohesiveness metric of the children co-cluster exceeds the pre-determined threshold and the second cohesiveness metric of another children co-cluster generated by partitioning the leaf co-cluster is less than the pre-determined threshold, borrowing a first entity from the children co-cluster to add to the another children co-cluster; and when the second cohesiveness metric of each of all children co-clusters generated by partitioning the leaf co-cluster is less than the pre-determined threshold, assigning the leaf co-cluster as one of the plurality of final co-clusters.

22. The system of claim 21, wherein each partitioning step of the recursively partitioning step generates two children co-clusters; and wherein the leaf co-cluster is partitioned only when the leaf co-cluster comprises at least two first entities and at least two second entities.

23. The system of claim 21, wherein the leaf co-cluster comprises a portion of the plurality of first entities and a portion of the plurality of second entities, wherein the children co-cluster comprises a subset of the portion of the plurality of first entities and a subset of the portion of the plurality of second entities, wherein the second cohesiveness metric of the children co-cluster is defined as a ratio of a sum of weights of (first entity, second entity) pairs within the children co-cluster to a sum of weights of (first entity, second entity) pairs within the leaf co-cluster that originates from the children co-cluster, and wherein each of the weights is determined from a corresponding element in the association matrix.

24. The system of claim 17, wherein a (first entity, second entity) pair of the association matrix comprises at least one of (browsed website, browsing user), (account metric, account user), (word, document containing word), (VoIP speech metric, speaker), and (image feature, image containing image feature).

* * * * *